United States Patent
Hampton

(10) Patent No.: US 8,352,292 B2
(45) Date of Patent: Jan. 8, 2013

(54) PERSONAL INJURY VALUATION SYSTEMS AND METHOD

(76) Inventor: Thurman B. Hampton, Tucker, GA (US)

(*) Notice: Subject to any disclaimer, the term of this patent is extended or adjusted under 35 U.S.C. 154(b) by 597 days.

(21) Appl. No.: 12/650,877

(22) Filed: Dec. 31, 2009

(65) Prior Publication Data

US 2011/0161115 A1  Jun. 30, 2011

(51) Int. Cl.
*G06Q 40/00* (2012.01)
(52) U.S. Cl. .............................. 705/4; 705/38
(58) Field of Classification Search ................ 705/4, 38
See application file for complete search history.

(56) References Cited

U.S. PATENT DOCUMENTS

| | | | |
|---|---|---|---|
| 5,875,431 A | 2/1999 | Heckman et al. | |
| 5,956,687 A | 9/1999 | Wamsley et al. | |
| 6,560,592 B1 | 5/2003 | Reid et al. | |
| 6,810,382 B1 | 10/2004 | Wamsley et al. | |
| 7,376,573 B1 | 5/2008 | Costonis et al. | |
| 7,571,107 B1 | 8/2009 | Jones et al. | |
| 2008/0255887 A1* | 10/2008 | Gruter | 705/4 |
| 2009/0187428 A1 | 7/2009 | Scalet et al. | |
| 2009/0187429 A1* | 7/2009 | Scalet et al. | 705/4 |
| 2010/0125464 A1* | 5/2010 | Gross et al. | 705/4 |

* cited by examiner

*Primary Examiner* — Muriel Tinkler

(57) ABSTRACT

The present invention is a method for calculating a current monetary value of a personal injury claim wherein computers are utilized to store, process, manipulate and analyze information collected from finalized personal injury claims including data representative of the cause of the personal injury, the type of injury sustained, the location where the injury occurred, the amounts paid for medical services and the amounts claimed for medical services to calculate an average settlement multiple which, when multiplied by the current amount claimed as medical damages, yields a current average settlement value.

20 Claims, 13 Drawing Sheets

PERSONAL INJURY VALUATION SYSTEMS AND METHOD

FIELD OF THE INVENTION

The present invention is a computer implemented method for establishing a current monetary value of a personal injury claim wherein computers are utilized to process, manipulate and to analyze objective data associated with the factors that are critical to establishing a value for a personal injury claim including but not limited to: the cause of the personal injury; the location where the injury occurred; the nature of the injury suffered; the medical cost incurred by the victim; and the settlement multiple

BACKGROUND OF THE INVENTION

A personal injury is any physical, psychological or emotional injury suffered by a human being as a result of negligent or intentional conduct by another or an accidental injury sustained in the course of ones employment (worker compensation claims). Physical injuries can arise from involvement in an automobile accident, a common carrier accident (railroad, airline, and bus), a construction or other workplace accident, a dangerous or otherwise unsafe product (product liability) and other injury-causing situations. Personal injuries are not, however, limited to physical injuries. Claimants can recover for psychological harm as well. Psychological personal injuries are typically caused by psychological trauma associated with life-threatening or disfiguring physical injuries, a result of witnessing others suffer trauma, or the result of one's escape from serious injury following a traumatic event. The types of damages the injured party may recover include lost wages, loss of earnings capacity, pain and suffering, and reasonable medical expenses. Damages can include both present and future expected losses. Depending upon the type of conduct that caused the injury, the injured person may sue for an injunction to prevent the continuation of the tortuous conduct or for monetary damages. Motor vehicle crashes are the leading cause of injury morbidity and mortality in the United States, accounting for more than 40,000 deaths and 6 million injuries every year.

The current personal injury claims resolution mechanism consists of an injured party, a tort-feasor and, in some cases, the tort feasor's employer. The tort-feasor is the person or entity whose negligence caused the injury and who is the potential defendant in a civil action initiated by the injured party. Typically, the tort-feasor is represented by an insurance liability carrier before and during trial. Initially, the parties will attempt to settle the claim out of court. Liability insurance companies initially use claims adjusters. Adjusters have no specific training regarding the valuation of claims and no specific, reliable, consistent and measurable standards by which to value a claim. Each claim is treated as a separate entity and factors are weighed according to the experience of the individual adjuster.

The injured party, or claimant, may represent himself/herself or hire an attorney to represent him before and during trial. Lawyers who represent injured parties have no specific training regarding the valuation of claims and no specific, reliable, consistent and measurable standards by which to value a claim. Lawyers also treat each claim as a separate entity and factors are weighed according to the experience of the individual attorney or, at most, experience within the law firm.

The only somewhat objective standard used by insurance companies and lawyers in their claims valuation mechanism is jury verdict information. Each party uses the threat of a trial to force the other to settle the claim and neither party, at least initially, will agree to a settlement that it considers less favorable than its expectation of the outcome at trial, including the uncertainty and costs of the litigation. Because juries apply uniquely local standards when awarding compensation, awards for the same type of injury vary widely from one location to another and perhaps even in the same geographic region. Nevertheless, the location of the potential trial is an objective factor in the settlement of most personal injury claims without regard to the nature of the claim or the injuries suffered.

In practice, the settlement value of the claim is determined in most cases by multiplying the claimant's medical costs, often referred to as "specials", by a factor that is negotiated by the parties. Specials are the incurred cost of medical treatment including physicians, institutional care, prescriptions and disability compensation. The insurance adjuster typically offers to settle the case for an amount that is 1.5 to 5 times the total monetary value of the specials. The usual claim is settled for an amount that is 1.5 to 5 times the monetary value of the claimant's specials. Lost wages and property damages are added to create a total settlement. The number by which the claimant's special damages are multiplied to reach the settlement amount is the settlement multiple. Therefore, the critical factor in valuation of claims is determining the appropriate settlement multiple for the specific case. Currently, the settlement multiple agreed upon depends on the relative negotiation skills, experience and reputations of the claims adjuster and the lawyer. Consequently, while the fact of having a lawyer will likely increase the settlement amount, the lawyer selected may have a greater bearing on the amount paid. Likewise, the skill and experience of the opposing insurance adjuster or defendant's attorney may negate the relative value of an attorney. The settlement values may be expressed as monetary currency, non-monetary currency or a combination of both monetary and non-monetary currency.

The current personal injury claims settlement mechanism has no reliable, consistent and measurable standards by which any actor in the process can accurately estimate the monetary value of a claim for personal injuries. The absence of reliable, consistent and measurable standards means that the end result is based more on the relative advocacy skills or experience of the competing parties than any objective analysis. These effects are particularly dangerous for the average claimant who is a layman and who has little idea of the value of his claim or how any value will be determined. The typical claimant does not have sufficient reliable and accurate information about the claims settlement mechanism to make even basic decisions about the best way to protect himself and his family against less than honorable insurance adjusters, health care providers or lawyers. His ignorance of the potential monetary value of his claim makes him unable to know when to accept a reasonable settlement offer or when to reject an unreasonable offer. He is totally dependent upon information and opinions provided by people whose motives are suspect and whose information is also limited.

The current claims valuation mechanism also causes insurance carriers to contribute to the rise in litigation and cost of claims. Often carriers will make initial settlement offers that offend the honest claimant and that drive him to seek advice from an attorney. Often carriers pay fraudulent, false or exaggerated claims, especially when the claimant simply accepts the initial offer. Carriers are then required to maintain and to increase the amounts maintained for loss adjustment expenses, thus driving up the cost of insurance premiums.

The existing claims valuation mechanism invites fraud. The case by case approach to resolution prevents lawyers and insurance carriers from seeing the bigger picture of phony claims, contrived injuries and inflated or false medical charges. Case by case resolution precludes or delays detection of fraudulent collusion between claimants, lawyers, tort feasors and health care entities. Case by case resolution also fails to detect fraud related to inflated or fraudulent medical charges. The current claims valuation mechanisms do not take advantage of or utilize historical data taken from settled case files to ensure that similarly situated claimants are treated similarly.

Previous inventions have focused only on administrative management of insurance forms or law firm claim forms, case files or customer files or on automating a dispute resolution process to facilitate the claims settlement process. Previous practice and previous inventions have not focused on development of an objective method of establishing the settlement multiple for a new claim using data from previously settled cases.

SUMMARY OF THE INVENTION

Consistent with embodiments of the present invention, a method implemented by a system whereby the value of a claim for personal injuries is determined. The system comprises at least memory storage and an analysis module. The system memory storage is configured for maintaining a database including data representative of historical personal injury claims. The analysis module is coupled to the memory storage and operatively configured to receive an input of data representative of a new personal injury claim. In response to the input of data representative of a new personal injury claim, the analysis module identifies and retrieves from the system memory storage historical claim data representative of subset pools of claims wherein each of the claims within the subset pools is comprised of claims wherein at least the causation of the injury, the injury suffered, and the location where the injury occurred are similar to the causation of the injury, injuries suffered, and location where the injury occurred for the new personal injury claim. The historical claims data retrieved from the system memory storage for inclusion in the subset pools consists of claims data that occurred within a relevant time before the date of the injury reported for the new personal injury claim. The system and method determine a settlement multiple associated with the historical claims retrieved from data storage. The system and method then use the settlement multiple and the damages indentified in the new personal injury claim to generate a settlement value for the new personal injury claim.

Various aspects of the invention are novel, non-obvious and provide various advantages. While the actual nature of the invention covered herein can be determined only with reference to the claims appended hereto, certain features which are characteristic of the preferred embodiment can be described briefly.

BRIEF DESCRIPTION OF THE DRAWINGS

The accompanying drawings, which are incorporated in and constitute a part of this disclosure, illustrate various embodiments of the present invention. While the actual nature of the invention covered herein can be determined only with reference to the claims appended hereto, certain features which are characteristic of the preferred embodiment can be described briefly. In the drawings:

GENERAL DESCRIPTION

Figure 1:
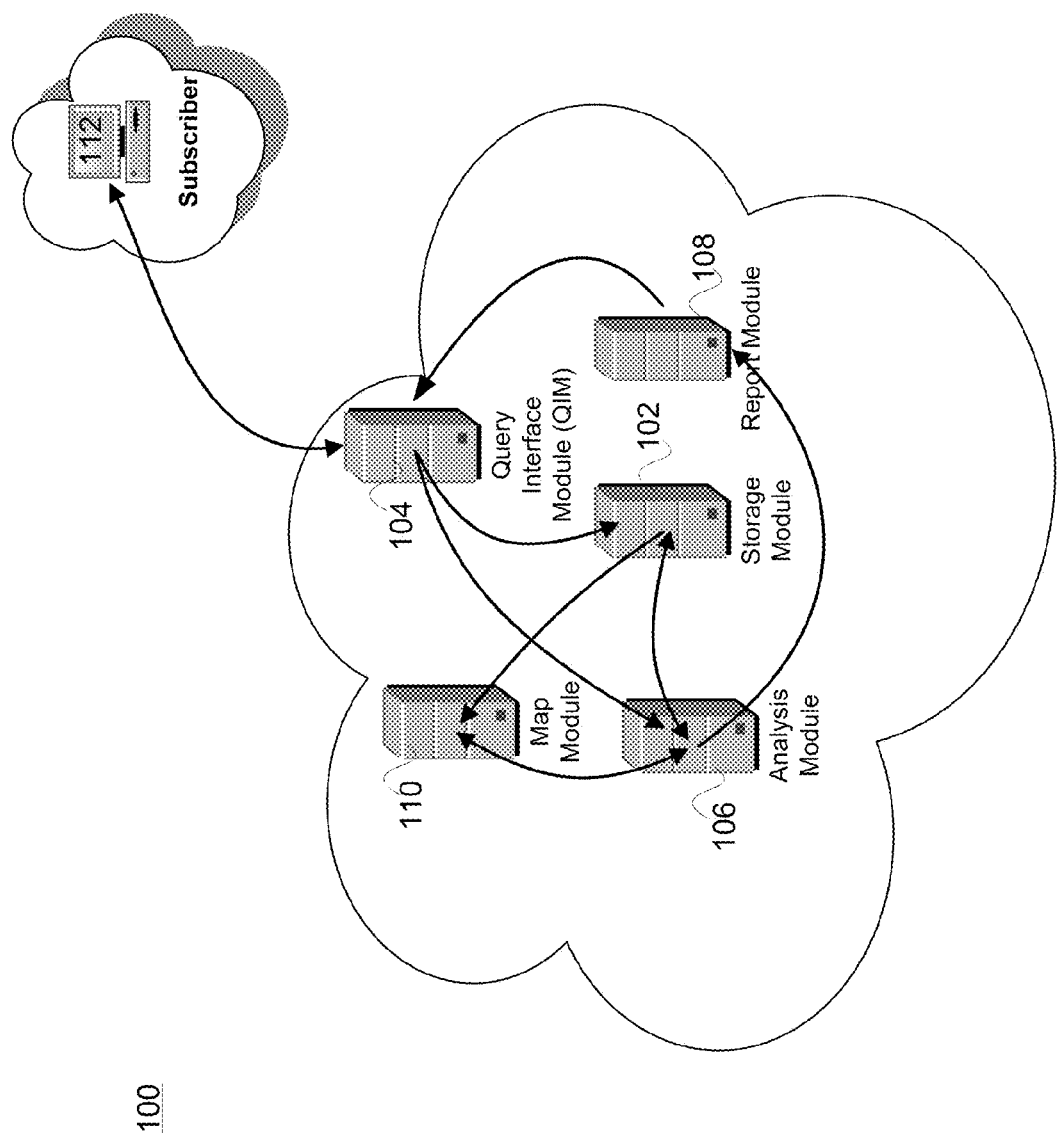
FIG. 1 is a depiction of the minimal computer functions required to support the invention.

The present invention is a system and method for establishing a current monetary value of a personal injury claim using computer enabled modules to perform data processing operations using personal injury claim objective data to determine the monetary value of a personal injury claim. The invention considers all factors that are critical to establishing a value for a personal injury claim including but not limited to: the type or cause of the personal injury (causation); the nature of the injury suffered by the victim; the cost of medical services; the location where the injury occurred; and, the relevant time when the injury occurred. The invention uses computers to store, analyze and retrieve information from a database of personal injury cases that have been terminated by way of litigation or settlement. The information in each case is stored in distinct data fields. The invention generates a settlement multiple and then generates the monetary value of the claim.

In one embodiment of the invention, an average settlement value for a new personal injury claim is generated. The system and method requires input of specific data about a new claim. The person providing the data may be an insurance adjuster, a personal injury attorney or a consumer (hereinafter referred to as the "subscriber"). The data fields into which the subscriber inputs information correlate to data fields of the stored case files. The system and method of the present invention searches the database to compare data from a new claim against data in the stored case files. The process yields search records of settled case files that have the same causation as the new claim, cases that occurred in the same (or nearby) geographic area as the new claim, and, cases that produced the same or similar injuries. To be relevant to the mechanism for establishing a value for the new claim, only cases that occurred within a specific time frame relative to the date of occurrence of the new claim will be considered. Usually, the period defined by the state statute of limitations for filing suit is a relevant time frame. While it is understood that this time frame may vary from jurisdiction to jurisdiction, that time is usually three years from the date of occurrence of the new claim.

Using the data from the cases in the search record, the system and methods implementing embodiments of the invention determines the average amount claimed as medical damages, determines the average amount actually paid to claimants and generates the average settlement multiple for those cases. Using the information provided by the subscriber, the system and method implementing the present embodiment generates the subscriber's medical costs and multiplies that amount by the average settlement multiple. The result is the average settlement value of the claim. The system and method implementing the present embodiment then adds the claimant's lost wages. The result is the average total settlement value of the subscriber's claim.

In another embodiment, the system generates an average settlement range for a new personal injury claim. The system implementing the present embodiment first generates the average settlement value of the new claim following the processes described in the first embodiment. The processes of the system implementing the first embodiment are incorporated herein by reference.

Next, the system and method generate a high settlement value of the new claim. The system and method then identifies all cases in which the amount paid to settle exceeds the average settlement value by a predetermined percentage variable greater than 100% of the average settlement value. The system and method implementing the present embodiment uses 125% as the predetermined percentage variable. Reference to a specific variable is illustrative, however and should not be construed as limiting the scope of the embodiment but as merely providing illustrations of the operation of the embodiment. Thus, the scope of the embodiment should be determined by the appended claims and their legal equivalents rather than by the examples given. The cases identified as exceeding the average by 125% or more are considered high value cases. The system and method then determines the average amount claimed as medical costs in the high value cases and determines the average amount actually paid to the claimants in the high value cases. The system and method determines the average settlement multiple for the high value cases. Using the information provided by the subscriber, the system and method determines the subscriber's medical costs and multiplies the subscriber's medical costs by the high average high value settlement multiple. The result is the average high settlement value of the claim.

The system and method implementing the present embodiment then determines the low settlement value of the claim. The system identifies all cases in which the amount paid to settle a claim is less than the average settlement value for all cases. The system and method use a predetermined percentage variable which is less than 100% of the average settlement value. The system and method implementing the present embodiment uses 75% as the predetermined percentage variable. The use of a specific variable is illustrative only and should not be construed as limiting the scope of the embodiment but as merely providing illustrations of the operation of the embodiment. Thus, the scope of the embodiment should be determined by the appended claims and their legal equivalents rather than by the examples given. Consequently, all claims in which the amount paid is 75% or less than the average amount actually paid claimants fall into the low value category. Next, the system and method determines the average amount claimed as medical costs in the low value cases and determines the average amount actually paid to the claimants in the low value cases. The system and method then determines the average settlement multiple for the low value cases. Using the information provided by the subscriber, the system determines the subscriber's medical costs and multiplies the subscriber's medical costs by the low average high value settlement multiple. The result is the average low settlement value of the claim. Determining the high, average and low settlement values creates an optimum settlement range for the subscriber's new claim.

Another embodiment of the invention objectively determines the impact of jury verdicts on the value of a new claim. The system and method identifies all cases from the database that have the same causation as the new case; that occurred in the same geographic region as the new case; that occurred within a relevant time to the new case; and that have the same injuries as described for the new case. The system and method then identifies all cases within the search results that were tried by jury and creates a database of those cases. The system and method also identifies all cases that were resolved by settlement and creates a separate database for those cases. The system and method determines the average amount awarded as damages in the cases tried by juries and the average amount awarded as damages in non jury cases. The system and method also determines the average settlement multiple for jury cases and the average settlement multiple for non jury cases. The system and method implementing the present embodiment then reports, among other things, the findings and demonstrates the average awards and the average settlement multiples for jury and non jury cases from the database cases.

In another embodiment of the invention the system and method determines the effect of punitive damages on the value of a claim for personal injuries. In this embodiment, the system and method identifies all cases from the database that have the same causation as the new case; that occurred in the same geographic region as the new case; that occurred within a relevant time to the new case; and that have the same injuries as described for the new case. The system and method identifies and counts all cases within the search results in which punitive damages were awarded. The system and method also identifies and counts all cases within the search results in which punitive damages were not awarded. The system and method determines the average amount awarded as damages in the cases in which punitive damages were awarded and the average amount awarded as damages in non-punitive damage cases. The system and method also determines the average settlement multiple for the punitive damage cases and the average settlement multiple for non-punitive damage cases. The system and method also generates reports that illustrate, among other things, the findings and demonstrates the average amounts awarded as damages in the punitive and non-punitive damage cases, and the average settlement multiple for each.

In another embodiment of the invention, the system and method detects the potential for fraud by verifying the treatment protocol and medical cost information demanded in a new personal injury claim against costs for medical care and treatment protocol for finalized cases. The premise is that similar injuries occurring in the same geographic region should be treated with similar medical procedures and the costs should be similar within a reasonable variation. A case in which the treatment protocol described by a subscriber does not match the treatment protocol for cases in the database that involve the same kind(s) of injury, the same diagnosis, and the same prognosis should be examined to eliminate any issues of fraud. Likewise, a substantial variation in the cost claimed for specific treatments or procedures can be an indicator of fraud that warrants additional investigation.

The system and method implementing the present embodiment requires a subscriber to input information about the new claim using the Healthcare Common Procedure Coding System, the International Statistical Classification of Diseases and Related Health Problems or similar medical billing and coding system to identify the diagnosis, prognosis, treatment protocol and other factors about the old and new cases. The use of or reference to a specific standard is illustrative only and should not be construed as limiting the scope of the embodiment but as merely providing illustrations of the operation of the embodiment. Thus, the scope of the embodiment should be determined by the appended claims and their legal equivalents rather than by the examples given. The system and method compares the new claim data to data from the finalized case database from cases that involved the same kind of causation as the claim reported by the subscriber, that occurred in the same geographic region, and in which the victim suffered the same kinds of injuries. The system and method reports any discrepancies as the potential for fraud.

If triggered, the system and method implementing the present embodiment conducts a systematic evaluation and comparison of each item of damages claimed by the subscriber and compares each to the amount paid for the corresponding item of damages in the database cases. The product generated by the system implementing the present embodiment is a report which identifies each element of damages provided by the subscriber that exceeds 115% of the average amount of the corresponding element of damages from the database cases. While not dispositive of the issue of fraud, a disparity of 115% or more gives the reasonably prudent negotiator reason to question the validity of the charges. While the system and method used to implement the embodiment use a variable of 115%, it is anticipated that the system can be adjusted to use another predetermined percentage variable.

DETAILED DESCRIPTION

FIG. 1 is a depiction of the system functionality and the manner in which the modules operating on the system communicate in order to support the invention. Each embodiment of the system and method implemented thereby relies upon computerized data processing of data within data fields in order to generate data representative of personal injury claim values. The preferred configuration consists of commercial, off the shelf computer hardware and software systems. The configuration includes a robust relational database function that allows the input of data in fields from multiple data feeds; retrieval of data; data processing operations; calculation operations; and, mapping operations. The preferred system uses Microsoft SQL Server™ with the following SQL Server technologies: Database Engine; Data Warehousing; Analysis Services—Multidimensional Data; Analysis Services—Data Mining; Integration Services; Replication; Reporting Services; and, Service Broker. While a robust database program operates as a seamless whole, for purposes of illustration and explanation, the description of each embodiment of the present invention assumes that the system 100 implementing embodiments of the present invention consists of a Structured Query Language database program and supporting hardware capable of providing at least: a memory storage module 102, a query interface module 104, an analysis module 106, a report module 108, and a map module 110. The memory storage module 102 stores, processes, and secures data. It provides controlled access and rapid transaction processing to meet the requirements of the data consuming applications. The query interface module 104 allows access to the system. The analysis module 106, which is coupled to the memory storage module and configured to receive an input of data representative of new personal injury claims. The analysis module 106 supports rapid analysis of data, analytical processing and data mining functionality. The analysis module 106 allows the design, creation, and management of multidimensional structures that contain detail and aggregated data from multiple data sources in a single unified logical model supported by built-in calculations. The report module 108 provides comprehensive data reporting. It allows for the creation of interactive, tabular, or free-form reports, can retrieve data at scheduled intervals or on-demand when the user opens a report, and enables users to create ad hoc reports based on predefined models, and to interactively explore data within the model. The map module 110 identifies Postal Zip Code data including identification of contiguous zip codes.

The memory storage module 102 contains databases of information about finalized personal injury cases. The sources of data include finalized case files maintained by liability insurance carriers, court files, the internet, hospital or health care provider information or directly from claimants.

Table 1 describes the data that is relevant to the valuation of personal injury claims. Each data record is referred to as a "case" and each case is assigned a unique case number as an identifier. The data fields include factors relevant to valuation of a claim under the current state of civil law practice. The relevance, description or name of the factors may change as the law or rules of practice change. Consequently, it is contemplated that the preferred list of fields may be modified to meet specific jurisdictional requirements. Although the descriptions that follow contain much specificity, these should not be construed as limiting the scope of the embodiment but as merely providing illustrations of the kind of information required and the operation of some of the embodiments. Thus, the scope of the embodiment should be determined by the appended claims and their legal equivalents rather than by the examples given.

TABLE 1

Database/Repository Information

| Field Number | Field Content |
|---|---|
| | Claimant Information |
| 1 | Claimant's Full name |
| 2 | Address at the time of the incident that caused the injury, including Zip Code |
| 3 | Address at time of settlement if different from above |
| 4 | Date of Birth |
| 5 | Race or Ethnic origin (If available) |
| 6 | Date of the incident on which the claim is based |
| 7 | Zip Code of locality where incident that caused the injury occurred |
| 8 | Location of trial or settlement (name of city and zip code) Type of Personal Injury Claim (one will be identified) |
| 9 | Automobile Collision/Negligence |
| 10 | Medical Malpractice |
| 11 | Worker Compensation |
| 12 | Premises Liability |
| 13 | Slip and Fall |
| 14 | Intentional Tort (Slander, Defamation, Assault etc.) |
| 15 | Dog or Other Animal Bite |
| 16 | Product Liability |
| 17 | Toxic Materials |
| 18 | Pharmaceutical |
| 19 | (Narrative key word description of the incident that caused the injury) Claimant Injury information |
| 20 | Diagnosis using standardized medical diagnostic and billing code system entries |
| 21 | Secondary diagnosis using standardized medical diagnostic and billing code system entries |
| 22 | Type or description of injury using descriptive words |
| 23 | Treatment Protocol: Procedures, services or supplies using standardized medical diagnostic and billing code system entries |
| 24 | Length of Treatment (in weeks) |
| 25 | Prognosis using standardized medical diagnostic and billing code system entries |

TABLE 1-continued

Database/Repository Information

| Field Number | Field Content |
|---|---|
| 26 | Disability rating using standardized medical diagnostic and billing code system entries |
| 27 | Narrative, key word description of the disability |
| | Healthcare Provider Information |
| 28 | Provider identification code for each procedure, service or supply |
| 29 | Name and address of treating physician/healthcare provider |
| 30 | Specialty of physician (Chiropractor, Neurosurgeon, etc.) |
| | Damage Characteristics |
| | Claim for Lost wages |
| 31 | Claimant's type of work or profession before the injury |
| 32 | Claimant's employer at time of injury |
| 33 | Claimant's average hourly income before the injury |
| 34 | Type of work or profession after the injury |
| 35 | Number of hours claimant was unable to work |
| 36 | Amount claimed as anticipated future disability compensation |
| 37 | Total amount claimed for lost wages (excluding claim for anticipated future disability compensation) |
| | Claim for Medical Expenses (using standardized medical diagnostic and billing system codes) |
| 38 | Claim for payments to physicians, healthcare providers or healthcare institutions/facilities |
| 39 | Claim for cost of medical appliances, accessories, healthcare etc. included in payments to physicians, healthcare providers or healthcare institutions/facilities |
| 40 | Claim for x-rays |
| 41 | Claim for laboratory work |
| 42 | Claim for diagnostic procedures (e.g., CT scans, MRI's, etc.) |
| 43 | Claim for medical monitoring if reasonably necessary due to the injuries which have been sustained |
| 44 | Claim for cost of institutional services |
| 45 | Expenses claimed for nursing expenses |
| 46 | Expenses claimed for physical therapy expenses |
| 47 | Expenses claimed for psychological or psychiatric treatment |
| 48 | Expenses claimed for rehabilitation expenses |
| 49 | Expenses claimed as retraining expenses (e.g., speech therapy and vocational rehabilitation) |
| 50 | Expenses claimed for prostheses |
| 51 | Expenses claimed for physical aid and equipment, such as crutches, canes, wheelchairs, collars and braces |
| 52 | Expenses claimed for medical appliances, accessories, healthcare etc. not included in payments to physicians, healthcare providers or healthcare institutions/facilities |
| 53 | Total amount claimed for Medical Expenses (sum of fields 38 to 52) |
| | Prescriptions and other Medications (using standardized medical diagnostic and billing system codes) |
| 54 | Name(s) of prescription medication(s) required as result of or treatment for injuries sustained |
| 55 | How long prescription medication was taken (as claimed) |
| 56 | Amount claimed as total cost of prescription medicines |
| 57 | Amount claimed as total anticipated cost of prescription medicines (per year) |
| 58 | Name(s) of non-prescription medicine(s) required as result of or treatment for injuries sustained |
| 59 | Amount claimed as total cost of non-prescription medicines |
| 60 | Amount claimed as anticipated future cost of non-prescription medicine(s) |
| 61 | Total amount claimed for Prescription and other Medication (sum of fields 57, 58 and 60 ) |
| 62 | Total Medical Costs (Sum of fields 36, 53 and 61) |
| | Property Damage Claim |
| 63 | Narrative description of property damaged |
| 64 | Amount claimed for damage to property |
| | Tort Feasor Information. (The person or entity determined to be at fault.) |
| 65 | Full name |
| 66 | Any known aliases |
| 67 | Address at the time of the incident causing the injury, including Zip Code |
| 68 | Date of birth |
| 69 | Race or ethnic origin (if available) |
| 70 | Occupation at the time of the incident causing the injury |
| | Attorney Information |
| 71 | Name of counsel if represented |
| 72 | Address of Counsel |
| | Claim Settlement Information |
| 73 | Amount paid as disability compensation |
| 74 | Amount paid for medical expenses |
| 75 | Amount paid as or for anticipated future medical costs |
| 76 | Amount paid for Prescription and other Medication |
| 77 | Amount paid for lost wages |
| 78 | Amount paid for property damage |
| 79 | Amount Paid for Punitive Damages |
| 80 | Total amount paid for claim - excluding property damage, lost wages and punitive damages |
| 81 | Total amount paid for claim - including property damage and lost wages |
| 82 | Was the claim resolved by settlement or by verdict? _ yes _ no (Choose one) (Jury verdict" includes cases decided by judge alone) |
| 83 | If by verdict - name of presiding judge |
| 84 | Was the claim against the employer of the person who actually caused the injury? (Choose "yes" or "no") |

Figure 2A:
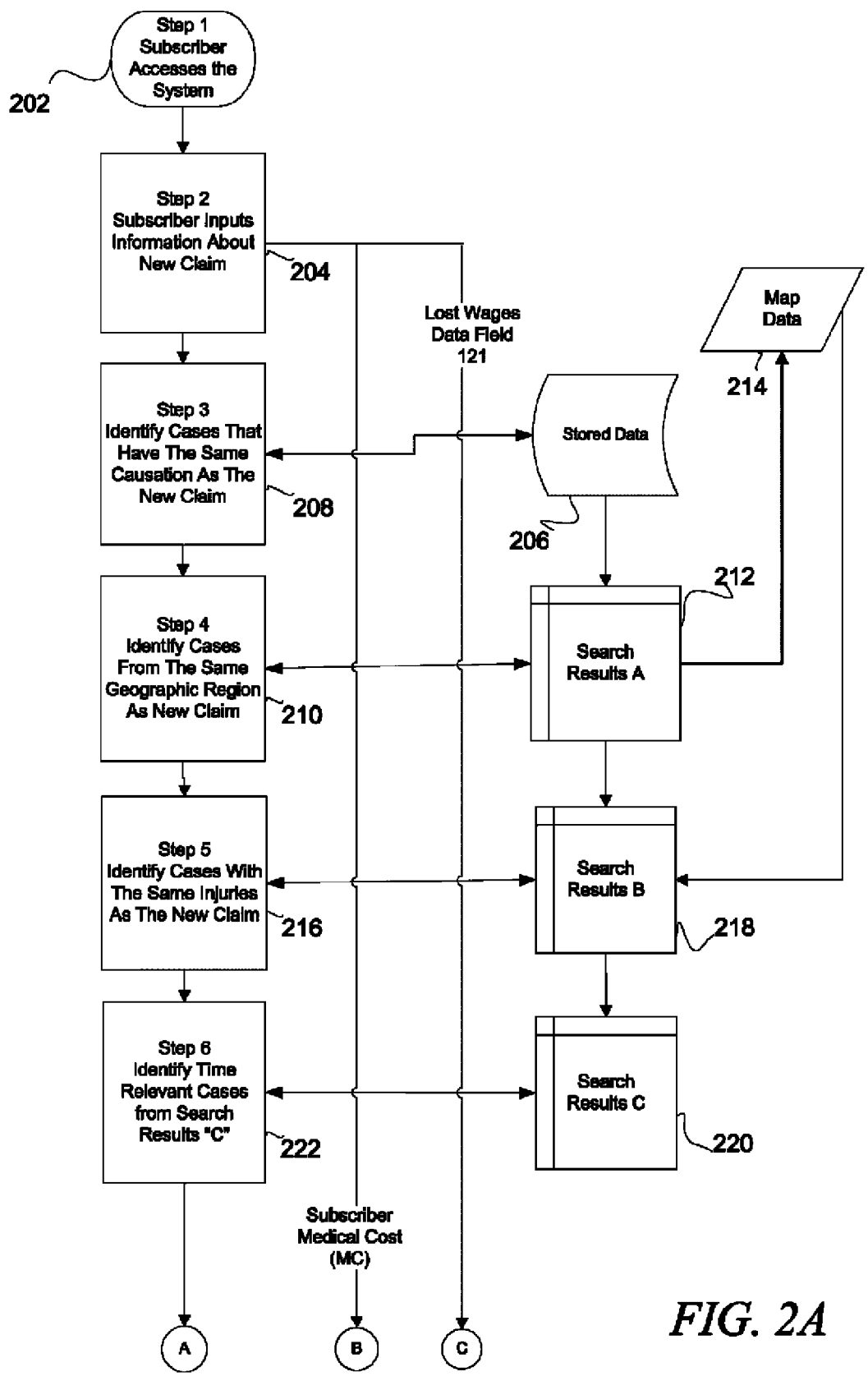
FIGS. 2a and 2b are flow charts that show the steps of the first embodiment in which an average settlement value for a new personal injury claim is—generated.
Figure 2B:
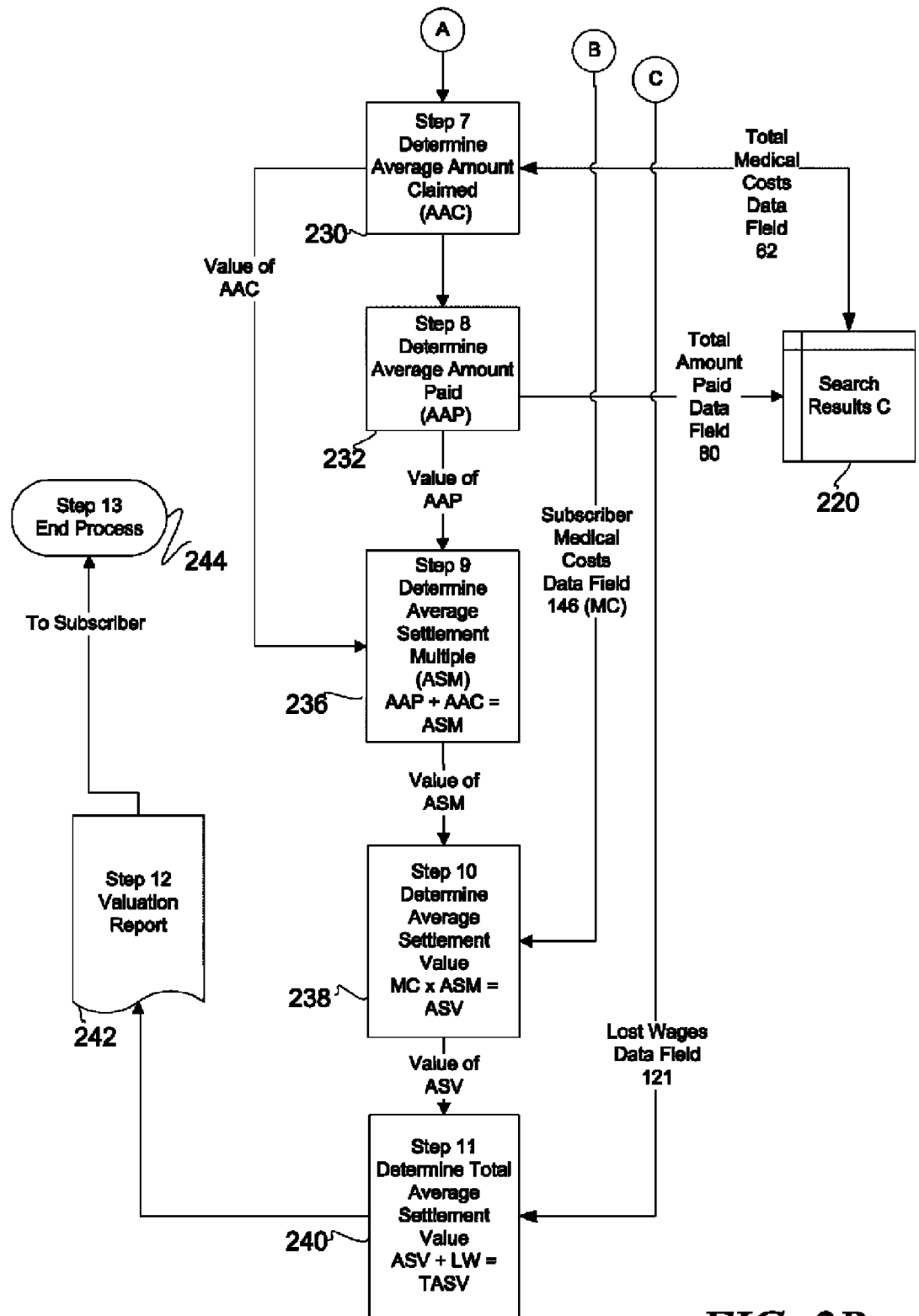

FIGS. 2(a) and 2(b) are flowcharts depicting the processes (identified as "steps") in the first embodiment of the invention. In the first embodiment, the system 100 and method implemented thereby determines an average value for the personal injury claim. In Step one 202 the subscriber connects to or accesses the system through the query interface module 104. In Step two 204, the subscriber enters data about the new claim by entering information into predefined tables in the memory storage module 102. The information provided by the subscriber mirrors the data fields in the historical cases in the memory storage module 102. Table 2 describes the data provided by the subscriber that is relevant to the valuation of personal injury claims and the preferred data field designations for subscriber data. Although the descriptions that follow contain much specificity, these should not be construed as limiting the scope of the embodiment but as merely providing illustrations of the kind of information required and the operation of some of the embodiments. Thus, the scope of the embodiment should be determined by the appended claims and their legal equivalents rather than by the examples given.

TABLE 2

Data Entered By Subscriber

| Field Number | Field Content |
|---|---|
| 85 | Claimant's Full name |
| 86 | Address at the time of the incident that caused the injury, including Zip Code |
| 87 | Current Address |
| 88 | Date of Birth |
| 89 | Race or Ethnic origin (optional) |
| 90 | Date of the incident on which the claim is based |
| 91 | Zip Code of site where incident that caused the injury occurred |
| 92 | Location (name of city and zip code) of the state court of general jurisdiction nearest the site where the injury occurred |

TABLE 2-continued

Data Entered By Subscriber

| Field Number | Field Content |
|---|---|
| | Type of Personal Injury Claim (one will be identified) |
| 93 | Automobile Collision/Negligence |
| 94 | Medical Malpractice |
| 95 | Worker Compensation |
| 96 | Premises Liability |
| 97 | Slip and Fall |
| 98 | Intentional Tort (Slander, Defamation, Assault etc.) |
| 99 | Dog or Other Animal Bite |
| 100 | Product Liability |
| 101 | Toxic Materials |
| 102 | Pharmaceutical |
| 103 | Other (Narrative key word description of the incident that caused the injury) |
| | Claimant Injury Information |
| 104 | Diagnosis using standardized medical diagnostic and billing system codes |
| 105 | Secondary diagnosis if any (using standardized medical diagnostic and billing system codes) |
| 106 | Type or description of injury using descriptive words |
| 107 | Treatment Protocol: Procedures, services or supplies using standardized medical diagnostic and billing code system entries |
| 108 | Length of Treatment (in weeks) |
| 109 | Prognosis (using standardized medical diagnostic and billing system codes) |
| 110 | Disability rating if any (using standardized medical diagnostic and billing system codes) |
| 111 | Narrative key word description of the disability including the part of body affected. |
| | Healthcare Provider Information |
| 112 | Provider identification code for each procedure, service or supply |
| 113 | Name and address of treating physician/healthcare provider |
| 114 | Specialty of physician (Chiropractor, Neurosurgeon, etc.) |
| | Damage Characteristics |
| | Claim for Lost Wages |
| 115 | Claimant's type of work or profession before the injury |
| 116 | Claimant's employer at time of injury |
| 117 | Claimant's average weekly income before the injury |
| 118 | Type of work or profession after the injury |
| 119 | Number of hours (days or weeks) claimant unable to work |
| 120 | Amount claimed disability compensation |
| 121 | Total amount claimed for lost wages (excluding claim for anticipated future disability compensation) |
| | Itemized Claim for Medical Costs |
| 122 | Cost for physicians, healthcare providers or healthcare institutions/facilities |
| 123 | Cost of medical appliances, accessories, healthcare etc. included in payments to physicians, healthcare providers or healthcare institutions/facilities |
| 124 | Cost for x-rays |
| 125 | Cost for laboratory work |
| 126 | Cost for diagnostic procedures (e.g., CT scans, MRI's, etc.) |
| 127 | Cost for medical monitoring if reasonably necessary due to the injuries which have been sustained |
| 128 | Cost of institutional services |
| 129 | Cost for nursing expenses |
| 130 | Cost for physical therapy expenses |
| 131 | Cost for psychological or psychiatric treatment |
| 132 | Cost for rehabilitation expenses |
| 133 | Cost for retraining expenses (e.g., speech therapy and vocational rehabilitation) |
| 134 | Cost for prostheses |
| 135 | Cost for physical aid and equipment, such as crutches, canes, wheelchairs, collars and braces |
| 136 | Cost for medical appliances, accessories, healthcare etc. not included in payments to physicians, healthcare providers or healthcare institutions/facilities |
| 137 | Total Amount Claimed for Medical Costs (Sum of fields 122 to 136) Prescription and other Medication (using standardized medical diagnostic and billing system codes) |
| 138 | Name(s) of prescription medication(s) required as result of or treatment for injuries sustained |
| 139 | How long prescription medication was taken |
| 140 | Cost for prescription medicines |
| 141 | Anticipated cost of prescription medicines (per year) |
| 142 | Name(s) of non-prescription medicine(s) required as result of or treatment for injuries sustained |
| 143 | Cost of non-prescription medicines |
| 144 | Anticipated future cost of non-prescription medicine(s) |
| 145 | Total amount claimed for prescription and non prescription medication (sum of fields 140, 141, and 143). |
| 146 | Total Amount Claimed for Medical Expenses (Sum of fields 120, 137 and 145) |
| | Property Damage Claim |
| 147 | Narrative description of property damaged |
| 148 | The amount claimed for damage to property |
| | Tort Feasor Information. (The person or entity determined to be at fault.) |
| 149 | Full name (Indicate whether an entity or an individual) |
| 150 | Any known aliases |
| 151 | Address at the time of the incident causing the injury, including Zip Code |
| 152 | Date of Birth |
| 153 | Race or ethnic origin (if known) |
| 154 | Occupation at the time of the incident causing the injury |
| 155 | Is the Claim Asserted Against the Tort Feasor's Employer? a. If so, Name of the Employer |
| | Attorney Information |
| 156 | Name of counsel if represented |
| 157 | Address of Counsel |

In Step three 208, the system searches the historic case database 206 and identifies cases that have the same causation as the subscriber's case. Causation is referred to as the "type of personal injury" in both the database and the subscriber input tables. The subscriber can select only one "type of personal injury." The process identifies all cases in the database that have the same "type of personal injury" identified by the subscriber by comparing the data fields identified in Table 3.

TABLE 3

Fields Used to Determine Causation of Injury

| Field # | Type of Personal Injury Claim (one will be identified) | Subscriber Input Field # | Type of Personal Injury Claim (one will be identified) |
|---|---|---|---|
| 9 | Automobile Collision/Negligence | 93 | Automobile Collision/Negligence |
| 10 | Medical Malpractice | 94 | Medical Malpractice |
| 11 | Worker Compensation | 95 | Worker Compensation |
| 12 | Premises Liability | 96 | Premises Liability |
| 13 | Slip and Fall | 97 | Slip and Fall |
| 14 | Intentional Tort (Slander, Defamation, Assault etc.) | 98 | Intentional Tort (Slander, Defamation, Assault etc.) |
| 15 | Dog or Other Animal Bite | 99 | Dog or Other Animal Bite |
| 16 | Product Liability | 100 | Product Liability |
| 17 | Toxic Materials | 101 | Toxic Materials |

TABLE 3-continued

Fields Used to Determine Causation of Injury

| Field # | Type of Personal Injury Claim (one will be identified) | Subscriber Input Field # | Type of Personal Injury Claim (one will be identified) |
|---|---|---|---|
| 18 | Pharmaceutical Other | 102 | Pharmaceutical |
| 19 | (Narrative key word description of the incident that caused the injury) | 103 | Other (Narrative key word description of the incident that caused the injury) |

For example, if the subscriber selects "Automobile Collision/Negligence" as the type of personal injury, the process identifies all cases in the data storage module 102 in which Data Field 9 (Automobile Collision/Negligence) is identified as the type of personal injury. The process creates search results "A" 212 and provides a count of the total number of cases identified.

In Step four 210 the Map Module 110 identifies all cases in search results "A" 212 that occurred in the same geographic region as the subscriber's case. Step four ties the results of the causation analysis to the geographic area where the subscriber's injury occurred. The process compares the data in fields 8 and 92. If, for example, the subscriber identifies "30302" as the zip code in field 92 as the place where the injury causing incident occurred, the system will identify all cases in search results "A" that identified zip code "30302" in field 8 as the place of occurrence in those cases. If no cases are reported or if the number of cases identified for the specific zip code is small the system implementing the present embodiment identifies contiguous zip codes and searches for cases from those contiguous zip codes. The system records all zip codes searched and the number of cases in each. It also creates search results "B" 218.

In Step five 216 the analysis module 106 identifies all cases from search results "B" 218 that have the same injuries as those described by the subscriber. The system implementing the present embodiment compares data provided by the subscriber in fields 104, 105 and 106 and data in fields 20, 21 and 22 of the cases in search results "B" 218. Because a modern database program is capable of multiple simultaneous comparisons, Table 4 illustrates a sequence of the comparison of data fields.

TABLE 4

Injury Data Comparison

| Step # | Database Field | Database Field Content | Subscriber Input Field | Subscriber Input Field Content |
|---|---|---|---|---|
| 5 (a) | 20 | Diagnosis using standardized medical diagnostic and billing code system entries | 104 | Diagnosis using standardized medical diagnostic and billing system codes |
| 5 (b) | 21 | Secondary diagnosis using standardized medical diagnostic and billing code system entries | 105 | Secondary diagnosis (using standardized medical diagnostic and billing system codes) |
| 5(c) | 22 | Type or description of injury using descriptive words | 106 | Type or description of injury using descriptive words |

Step five (a) compares Data Field 20 (diagnosis using standardized medical diagnostic and billing code system entries) to Data Field 104 (diagnosis using standardized medical diagnostic and billing system codes). If the contents of the data fields match, the case is moved to search results "C" 220. Step five (b) compares Field 21 (secondary diagnosis codes, if any) to Field 105 (secondary diagnosis if any). If the contents of the data fields match, the case is moved to search results "C" 220. Step five (c) compares Field 22 (type or description of injury using descriptive words) to Field 106 (type or description of injury using descriptive words). If the contents of the data fields match, the case is moved to search results "C" 220.

In Step six 222, the system identifies the cases in search results "C" 220 in which the date of occurrence is relevant to the determination of settlement value. The system and method implementing the present embodiment uses three years as the relevant time. Nevertheless, it is assumed that the search parameters can be modified to select a different period of time. Using the data from data field 6, Step six 222 identifies all cases in search results "C" 220 that occurred within three years of the date of occurrence entered by the subscriber in data field 90. All cases that do not meet the relevant time criteria are removed from search results "C" 220.

Next, the system and method implementing the present embodiment determines the average settlement multiple for cases in search results "C" 220. Step seven 230 determines the average amount claimed as medical costs (AAC) for all cases in search results "C" 220 by adding the amounts from data field 62 (total medical costs) to achieve a total amount claimed as medical costs for all cases in search results "C" 220. The total is then divided by the number of cases included in search results "C" 220. The result is the average amount claimed as medical cost for cases in search results "C" 220.

In Step eight 232 the system and method implementing the present embodiment determines the average amount paid (AAP) to resolve the cases in search results "C" 220 by adding the amounts from data field 80 (total amount paid for claim less amount for property damage and punitive damages) to achieve a total amount paid to resolve the cases in search results "C" 220. The total is then divided by the number of cases included in search results "C" 220. The result is the average amount paid to resolve cases in search results "C" 220.

In Step nine 236 the system and method implementing the present embodiment determines the average settlement multiple for cases in search results "C" 220 applying the following formula: AAP÷AAC=ASM where "AAP" is the average amount paid; "AAC" is the average amount claimed as medical costs; and, "ASM" is the average settlement multiple.

In Step ten 238, the system and method implementing the present embodiment determines the average settlement value of the subscriber's claim applying the formula: MC×ASM=ASV where "MC" is the amount claimed as medical cost by the subscriber in data field 146; "ASM" is the average settlement multiple determined in Step six (c); and, "ASV" is the average settlement value.

In Step eleven 240, the system and method implementing the present embodiment determines the total average settlement value (TASV) of the claim by adding the Average Settlement Value (ASV) to the amount claimed for lost wages (LW) from field 121.

Step twelve 242 generates a valuation report through the Report Module 108 that shows pertinent information about the claim valuation decision. Table 5 depicts the list of items that are included in a basic report. The list of items shown is not intended to be exhaustive, exclusive or unalterable. The report is delivered to the subscriber 112 through the query interface 104. At Step thirteen 244, delivery of the report ends the process.

Figure 3A:
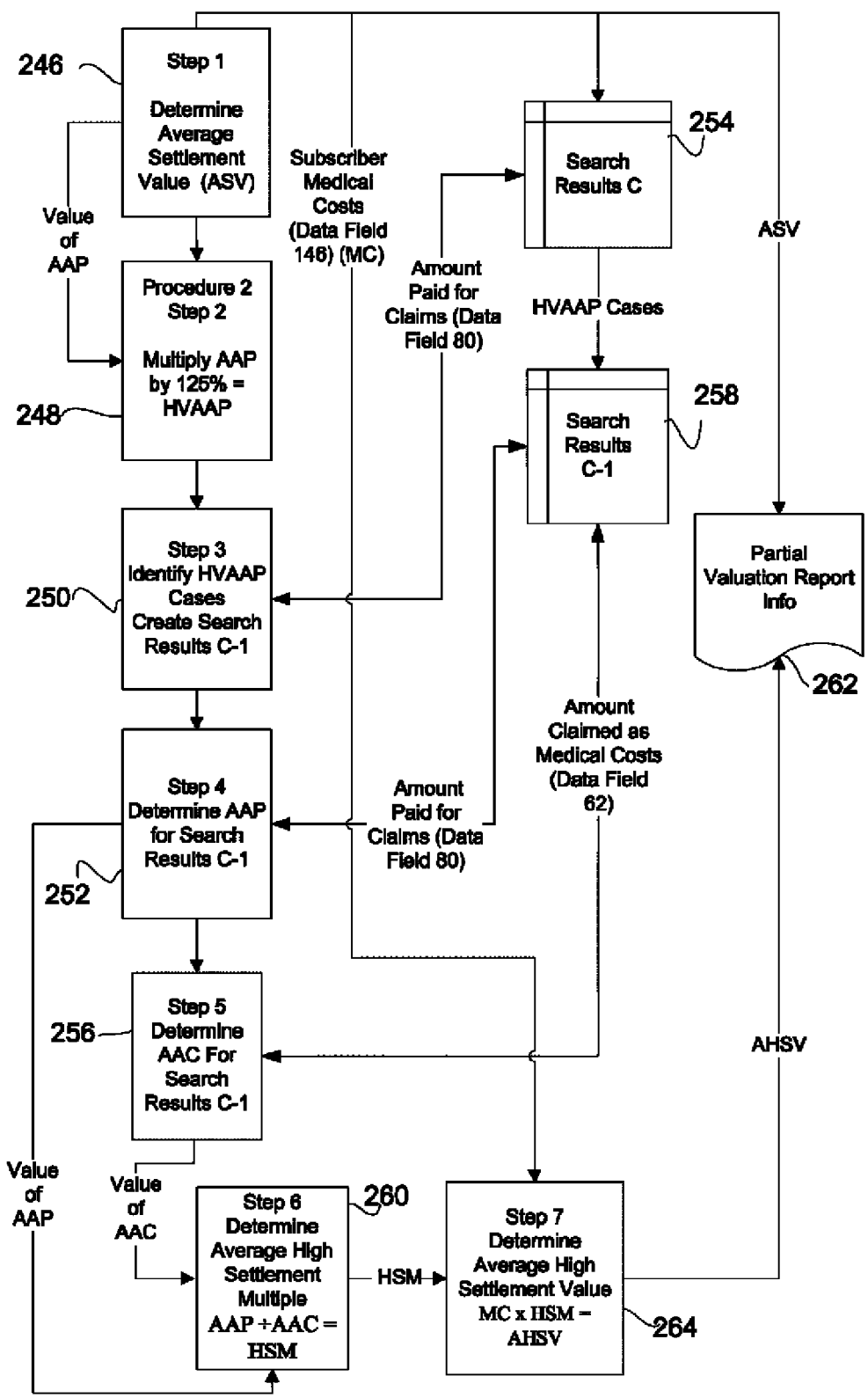
FIGS. 3a and 3b are flow charts that depict the second embodiment in which an average settlement range for a new personal injury claim is generated.
Figure 3B:
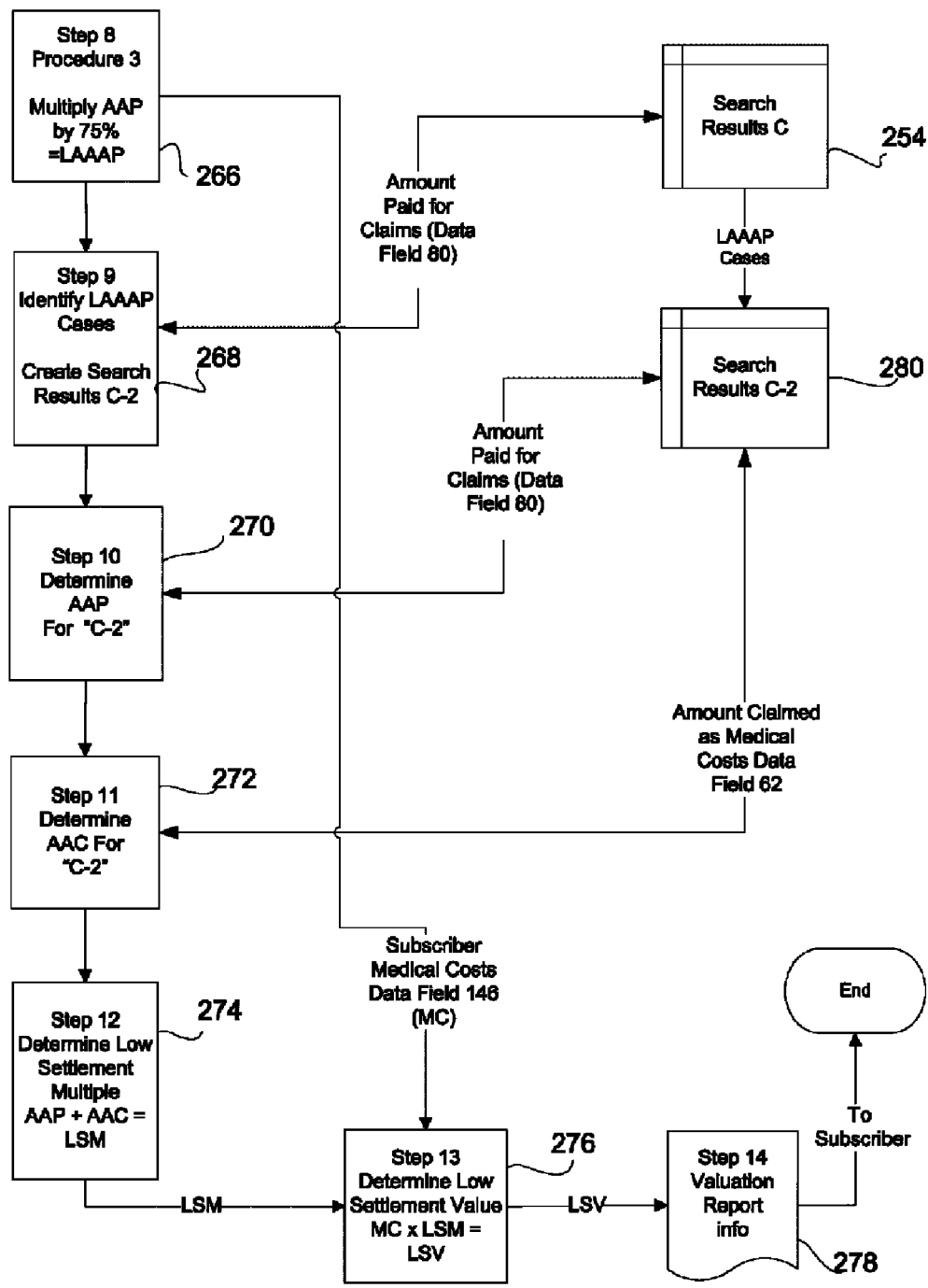

FIGS. 3a and 3b illustrate a second embodiment of the invention. In the second embodiment of the invention the system and method implementing this embodiment determines an average settlement range for a personal injury claim by determining a high settlement value, an average settlement value and a low settlement value for the subscriber's claim. The second embodiment is executed in three procedures that incorporate steps from the first embodiment. The first procedure of the second embodiment of the invention determines the average settlement value for the subscriber's claim. Step one 246 incorporates Steps one, two, three, four, five, six seven, eight, nine and ten of the first embodiment thereby generating an average settlement value of the new claim. The description of each step of the first embodiment is incorporated herein and adopted as the first procedure. For purposes of this embodiment, the process creates search results "C" 254. The average settlement value generated is stored as a partial valuation report 262.

In the second procedure of the second embodiment of the invention, the system and method implementing the present embodiment determines the average high settlement value of the new claim. To identify the high value cases for inclusion in the determination of the average high value settlement multiple, the system uses a predetermined percentage variable that is greater than 100% of the average amount paid (AAP) to resolve the cases in search results "C" 254 (generated in Step eight of the first embodiment). The system and method implementing the present embodiment uses 125% as the predetermined percentage. The use of a specific variable is illustrative only and should not be construed as limiting the scope of the embodiment but as merely providing illustrations of the operation of the embodiment.

Step two 248 multiplies the AAP determined in Step eight of the first procedure by 125% resulting in the high value average amount paid (HVAAP). Step three 250 identifies each case in search results "C" 254 in which the total amount paid for claims (Data Field 80) exceeds the HVAAP. The system creates search results "C-1" 258 a new search record for those cases. Search results "C-1" contains the high value cases from the database.

The system next determines the average settlement multiple for the cases in search results "C-1" 258. In Step four 252 the system determines the average amount paid (AAP) to settle all cases in search results "C-1" 258 using amounts from Data Field 80. The system adds the amounts from data field 80 from each case to achieve a total amount paid to resolve all cases in search results "C-1" 258 and then divides the total amount by the number of cases included in search results "C-1" 258. The result is the average amount paid to settle cases in search results "C-1" 258.

In Step five 256 the system determines the average amount claimed (AAC) as medical costs for all cases in search results "C-1" 258. The system adds the amounts from data field 62 (amount claimed as medical costs) from each case to achieve a total amount claimed as medical costs for all cases in search results "C-1" 258 and then divides the total amount by the number of cases included in search results "C-1" 258. The result is the average amount claimed as medical cost for cases in search results "C-1" 258.

In Step six 260 the system determines the average high settlement multiple using the formula: AAP÷AAC=AHSM—where APP is the average actual high settlement amount paid; AAC is the average high medical cost claim; and AHSM is the average high settlement multiple.

In Step seven 264 the system determines the average high settlement value of the subscriber's claim using the formula: MC×AHSM=AHSV where "MC" is the amount claimed as medical cost by the subscriber in data field 146; "AHSM" is the average high settlement multiple determined in Step six; and, "AHSV" is the average high settlement value. The average high settlement value generated is stored as a partial valuation report 262.

In the third procedure of the second embodiment, the system determines the low settlement value for the subscriber's claim. To identify the low value cases for inclusion in the determination of the average high value settlement multiple the system and method implementing the present embodiment uses a predetermined percentage variable that is less than 100% of the average amount paid (AAP) to resolve the cases in search results "C" 254 generated in Step eight of the first procedure. The system and method implementing the present embodiment uses 75% as the predetermined percentage variable. The use of a specific variable is illustrative only and should not be construed as limiting the scope of the embodiment but as merely providing illustrations of the operation of the embodiment.

Step eight 266 multiples the amount generated in Step eight of the first procedure by 75% resulting in the low average AAP (LAAAP). Step nine 268 identifies each case in search results "C" 254 in which the amount paid in Data Field 80 is less than the LAAAP. The system creates search results "C-2" 280 a new search record for these cases. Search results "C-2" contains the lower value cases from the database.

Next, the system determines the average settlement multiple for the cases in search results "C-2" 280. Step ten 270 generates the average amount paid (AAP) to settle all cases in search results "C-2" using amounts from Data Field 80. The system adds the amounts from data field 80 from each case to achieve a total amount for all cases in search results "C-2" 280. The system and method then divides the total amount by the number of cases included in search results "C-2" 280. The result is the average amount paid to settle cases in search results "C-2" 280.

In Step eleven 272 the system determines the average amount claimed as medical costs for all cases in search results "C-2" 280. The system adds the amounts from data field 62 from each case to achieve a total amount claimed as medical costs for all cases in search results "C-2." The system then divides the total amount by the number of cases included in search results "C-2." The result is the average amount claimed as medical cost for cases in search results "C-2."

In Step twelve 274, the system determines the average low settlement multiple using the following formula: AAP÷AAC=LSM—where AAP is the average actual low settlement amount paid; AAC is the average actual low amount claimed as medical cost; and LSM is the average low settlement multiple.

In Step thirteen 276, the system and method implementing the embodiment determines the average low settlement value of the subscriber's claim using the formula: MC×LSM=LSV where "MC" is the amount claimed as medical cost by the subscriber in data field 146; "LSM" is the average low settlement multiple determined in Step ten; and, "LSV" is the average low settlement value.

In Step fourteen 278, the report module generates a valuation report that shows the average settlement value, the high average settlement value and the low average settlement value. The process then ends.

Although the description above contains much specificity, these should not be construed as limiting the scope of the embodiment but as merely providing illustrations of some of the presently preferred embodiments. Thus, the scope of the embodiment should be determined by the appended claims and their legal equivalents rather than by the examples given.

Figure 4A:
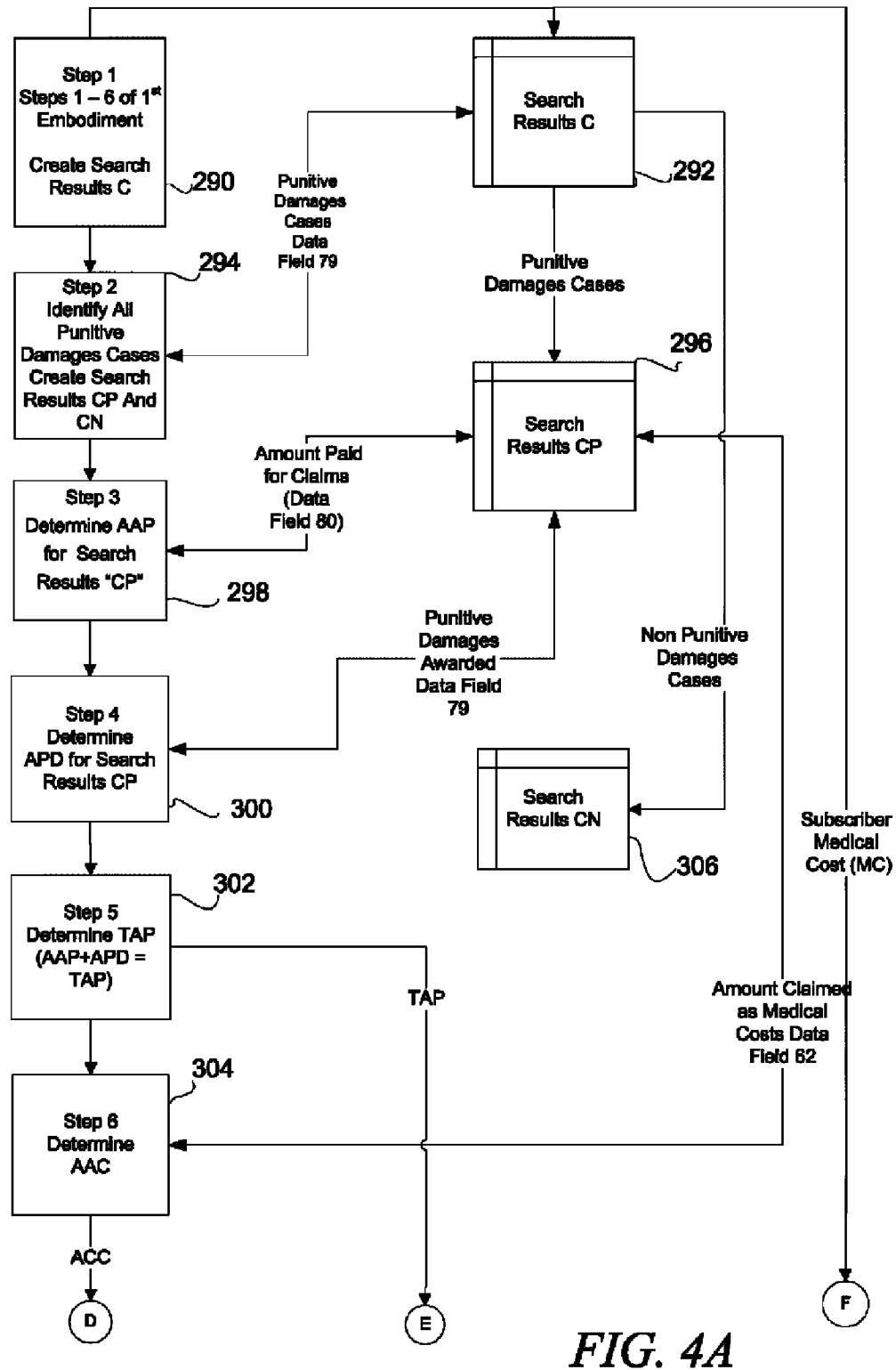
FIGS. 4a and 4b are flow charts that depict the process flow of a third embodiment of the invention which determines the effect of punitive damages on the potential value of a new personal injury claim.
Figure 4B:
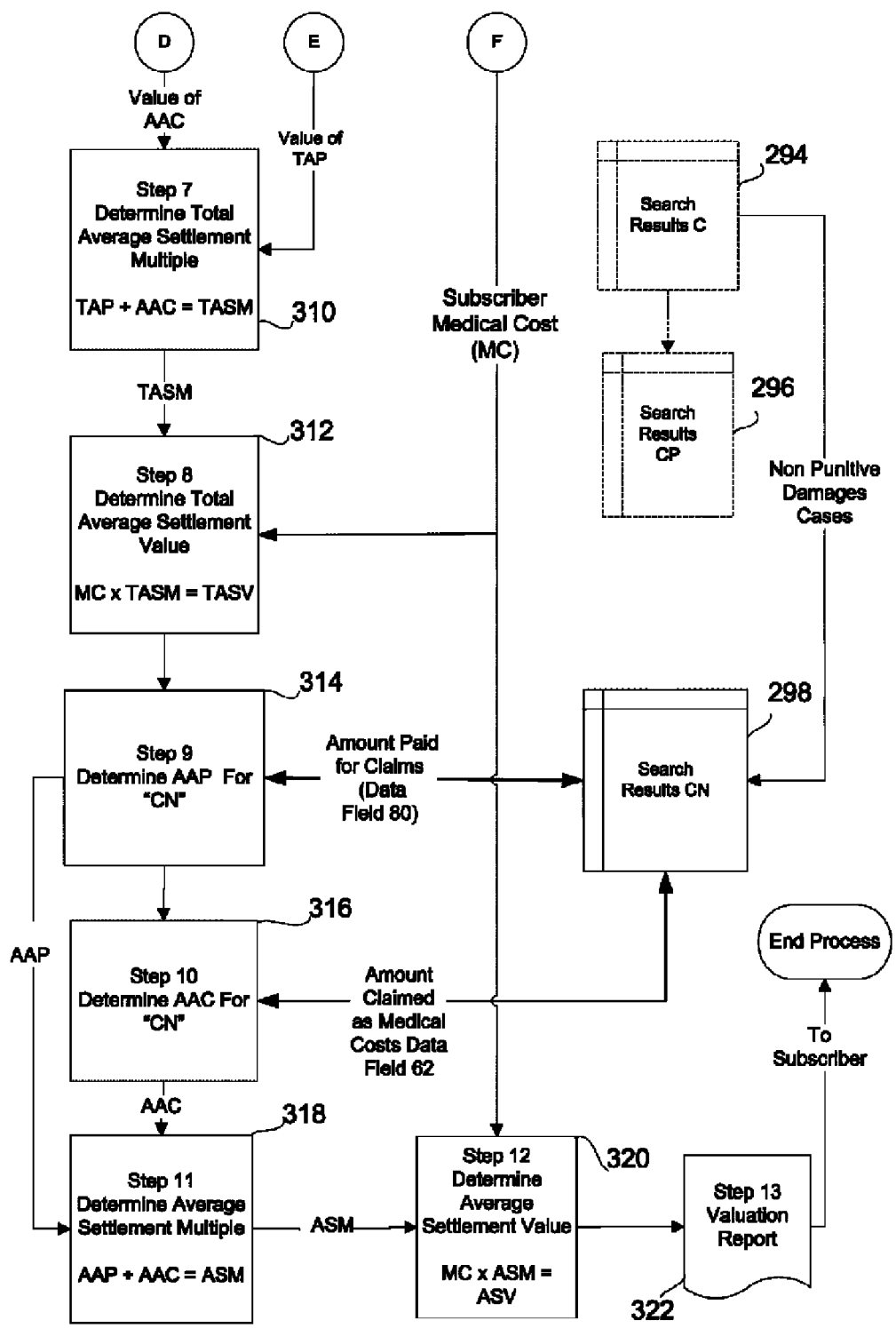

FIGS. 4*a* and 4*b* illustrate a third embodiment of the invention. In this embodiment the system and method implementing the embodiment determines the effect of punitive damages on the average settlement value of the new claim. In Step one 290 of the third embodiment, the system performs the steps described as Steps one, two, three, four, five and six of the first embodiment and creates search results "C" 292. The description of each step of the first embodiment is incorporated herein.

In Step two 294, the system identifies all cases in search results "C" 292 in which an entry is made in data field 79 (indicating that an amount was paid as punitive damages in that case). The system creates search results "CP" 296 in the storage module for those cases. The cases in which no entry is made in data field 79 are moved to search results "CN" 306 in the storage module.

In Step three 298, the system determines the average amount paid (AAP) to resolve the cases in search results "CP" 296 by adding the amounts from data field 80 (total amount paid for claim less amount for property damage and punitive damages) to achieve a total amount paid to resolve the cases in search results "CP" 296. The total is then divided by the number of cases included in search results "CP" 296. The result is the average amount paid to resolve cases in search results "CP" 296.

In Step four 300, the system determines an average amount awarded as punitive damages (APD) for the cases in search results "CP" 296 by adding the amounts from data field 79 to achieve a total amount and then dividing that amount by the number of cases included in search results "CP" 296. The result is the average amount awarded as punitive damages in cases in search results "CP" 296. In Step five 302, the system determines the total average amount paid (TAP) to resolve cases in search results "CP" 296 by adding the APD to the AAP.

Step six 304 determines the average amount claimed as medical costs (AAC) for all cases in search results "CP" 296 by adding the amounts from data field 62 to achieve a total amount claimed as medical costs for all cases in search results "CP" 296. The total is then divided by the number of cases included in search results "CP" 296. The result is the average amount claimed as medical cost for cases in search results "CP" 296.

In Step seven 310, the system determines the total average settlement multiple for cases in search results "CP" 296 using the formula: TAP÷AAC=TASM where "TAP" is the total average amount paid (including punitive damages); "AAC" is the average amount claimed as medical costs; and, "TASM" is the total average settlement multiple.

In Step eight 312, the system determines the total average settlement value of the subscriber's claim using the formula: MC×TASM=TASV where "MC" is the amount claimed as medical cost by the subscriber; "TASM" is the total average settlement multiple; and, "TASV" is the total average settlement value including punitive damages.

The system next determines the value of the cases in search results "CN" 298 for comparative purposes. In Step nine 314, the system determines the average amount paid (AAP) to resolve the cases in search results "CN" 298 by adding the amounts from data field 80 (total amount paid for claim less amount for property damage and punitive damages) to achieve a total amount paid to resolve the cases in search results "CN" 298. The total is then divided by the number of cases included in search results "CN" 298. The result is the average amount paid to resolve cases in search results "CN" 298.

In Step ten 316, the system determines the average amount claimed (AAC) as medical costs for all cases in search results "CN" 298 by adding the amounts from data field 62 to achieve a total amount claimed as medical costs for all cases in search results "CN" 298. The total is then divided by the number of cases included in search results "CN" 298. The result is the average amount claimed as medical cost for cases in search results "CN" 298.

In Step eleven 318, the system determines the total average settlement multiple for cases in search results "CN" 298 using the formula: AAP÷AAC=ASM where "AAP" is the average amount paid (excluding punitive damages); "AAC" is the average amount claimed as medical costs; and, "ASM" is the average settlement multiple.

In Step twelve 320, the system determines the total average settlement value of the subscriber's claim using the formula: MC×ASM=ASV where "MC" is the amount claimed as medical cost by the subscriber; "ASM" is the average settlement multiple; and, "ASV" is the average settlement value.

Step thirteen 322 generates a valuation report through the report module 108 that shows pertinent information about the claim valuation decision including a comparison of the claim values with and without punitive damages. Table five depicts the list of items that are included in a basic report. The list of items shown is not intended to be exhaustive, exclusive or unalterable.

Property damages are typically settled separately from the medical injuries claim and are usually not added to the total settlement value. Therefore, the preferred state of the invention treats property damages as separate from the personal injury claim valuation.

TABLE 5

PIVS Valuation Report

Figure 5A:
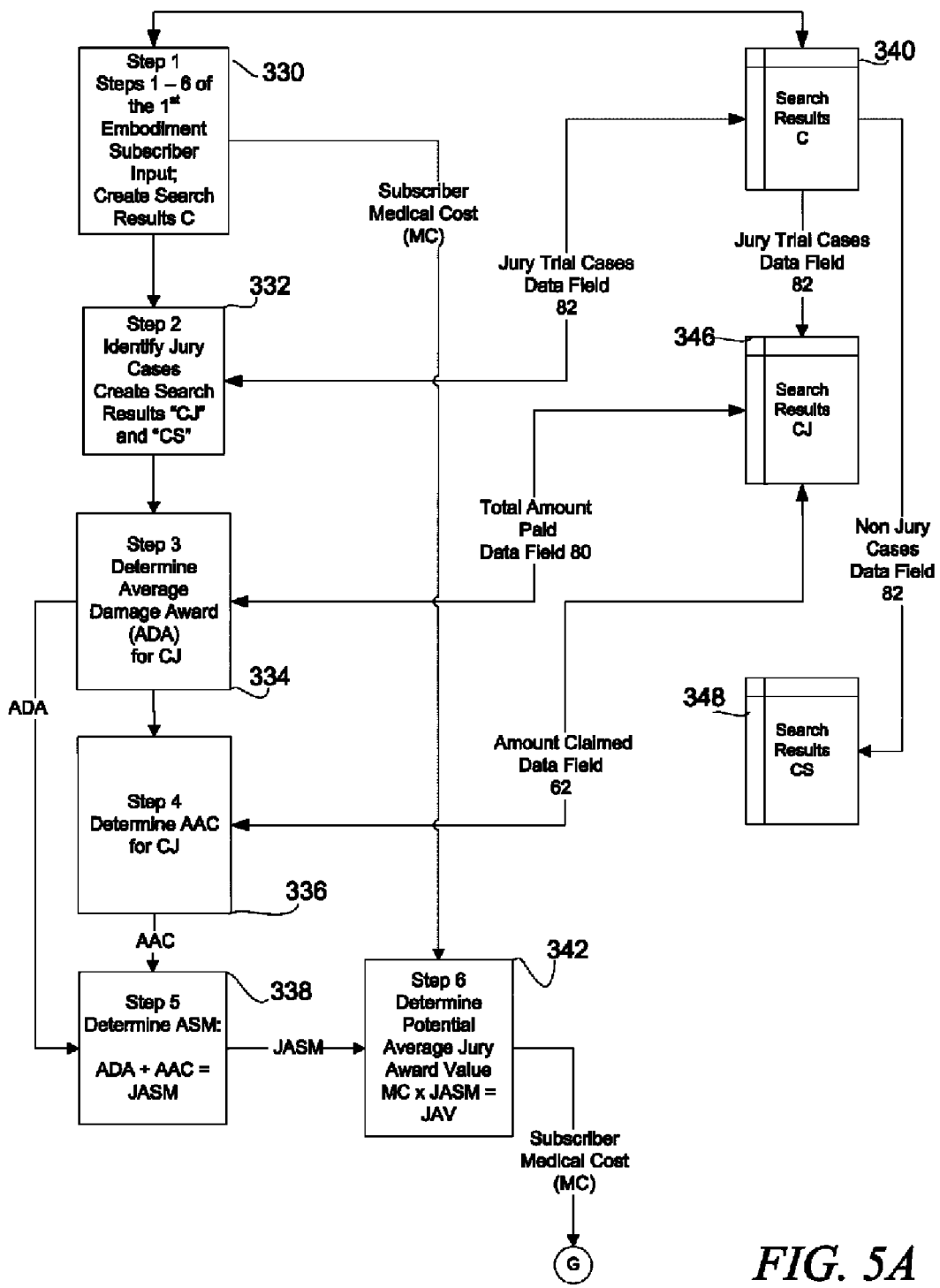
FIGS. 5a and 5b are flow charts that depict a fourth embodiment of the present invention which determines the effects of a jury verdict on the potential value of a new personal injury claim.
Figure 5B:
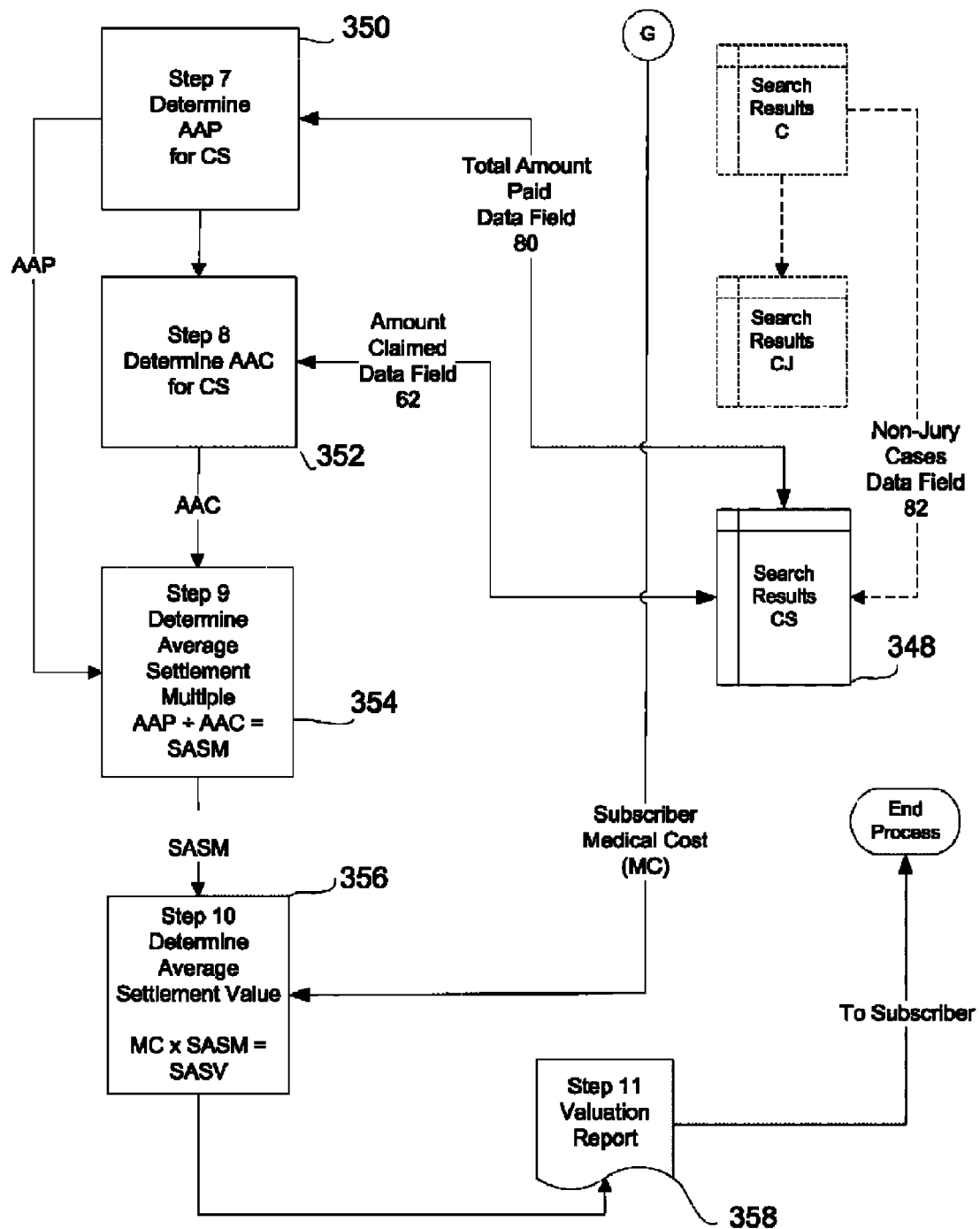
Figure 6A:
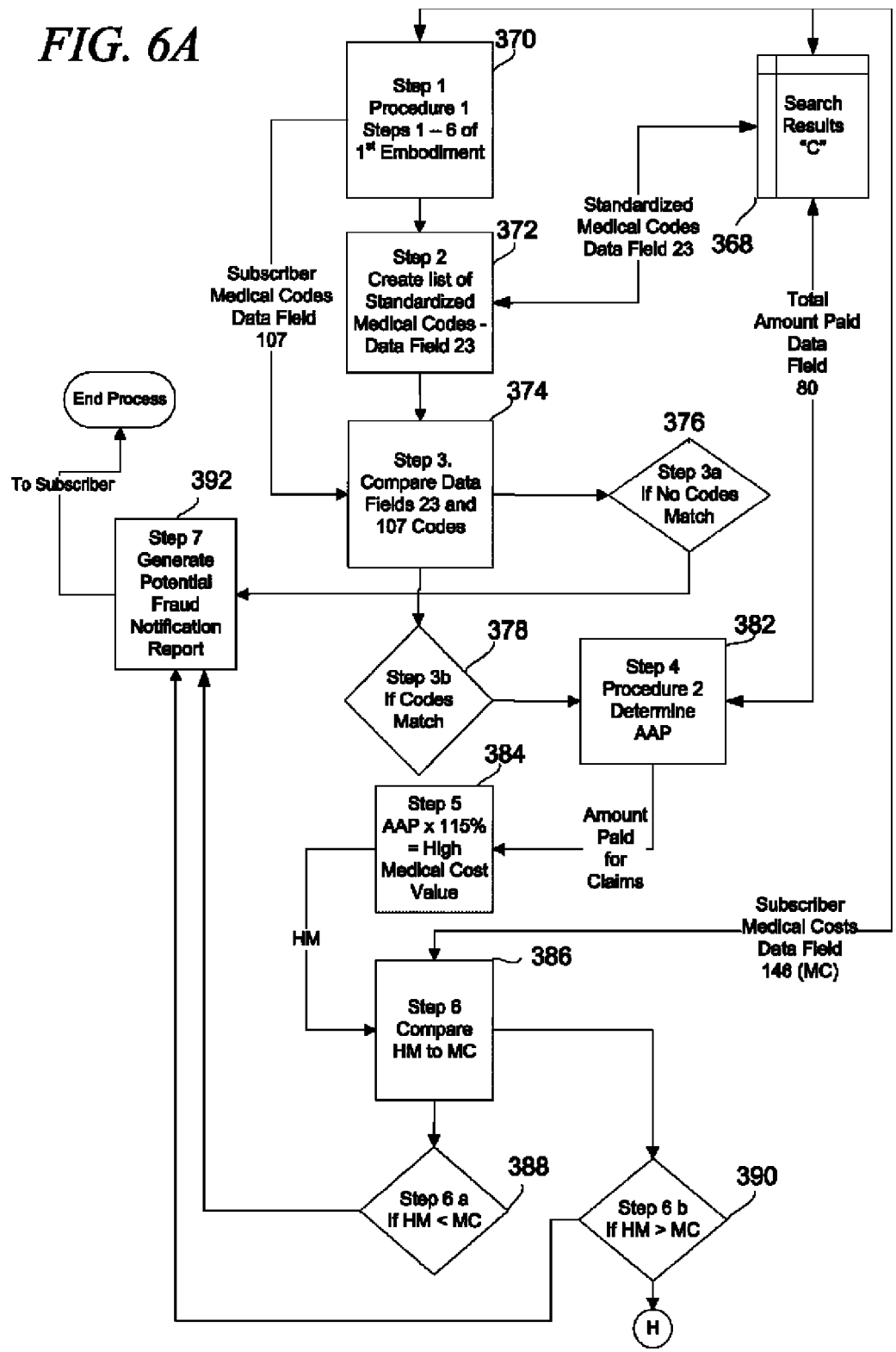
FIGS. 6a 6b 6c and 6d are process flow charts that depict the three procedures the inventive system executes to determine and to warn of the potential for fraudulent activity regarding a new claim for personal injuries.
Figure 6B:
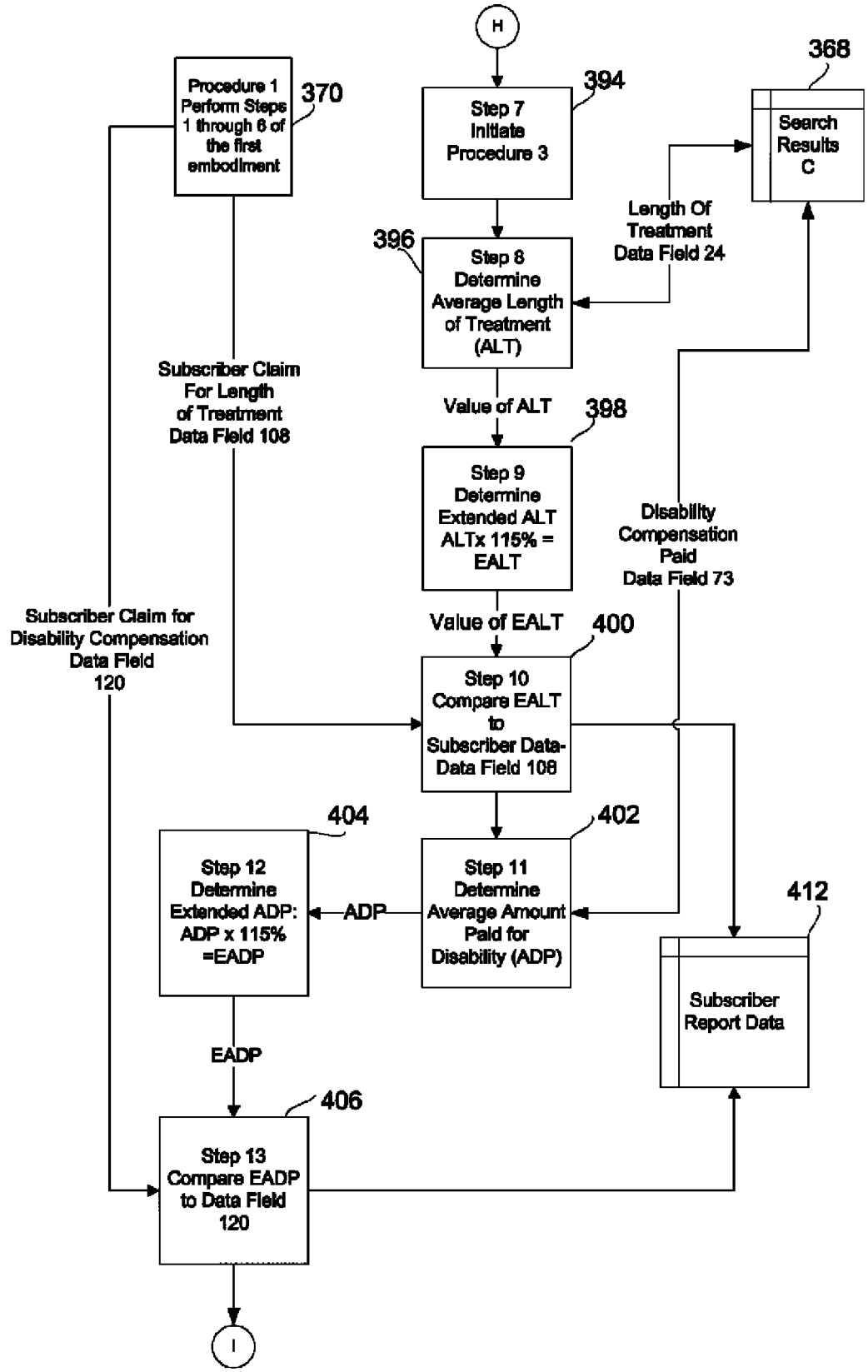
Figure 6C:
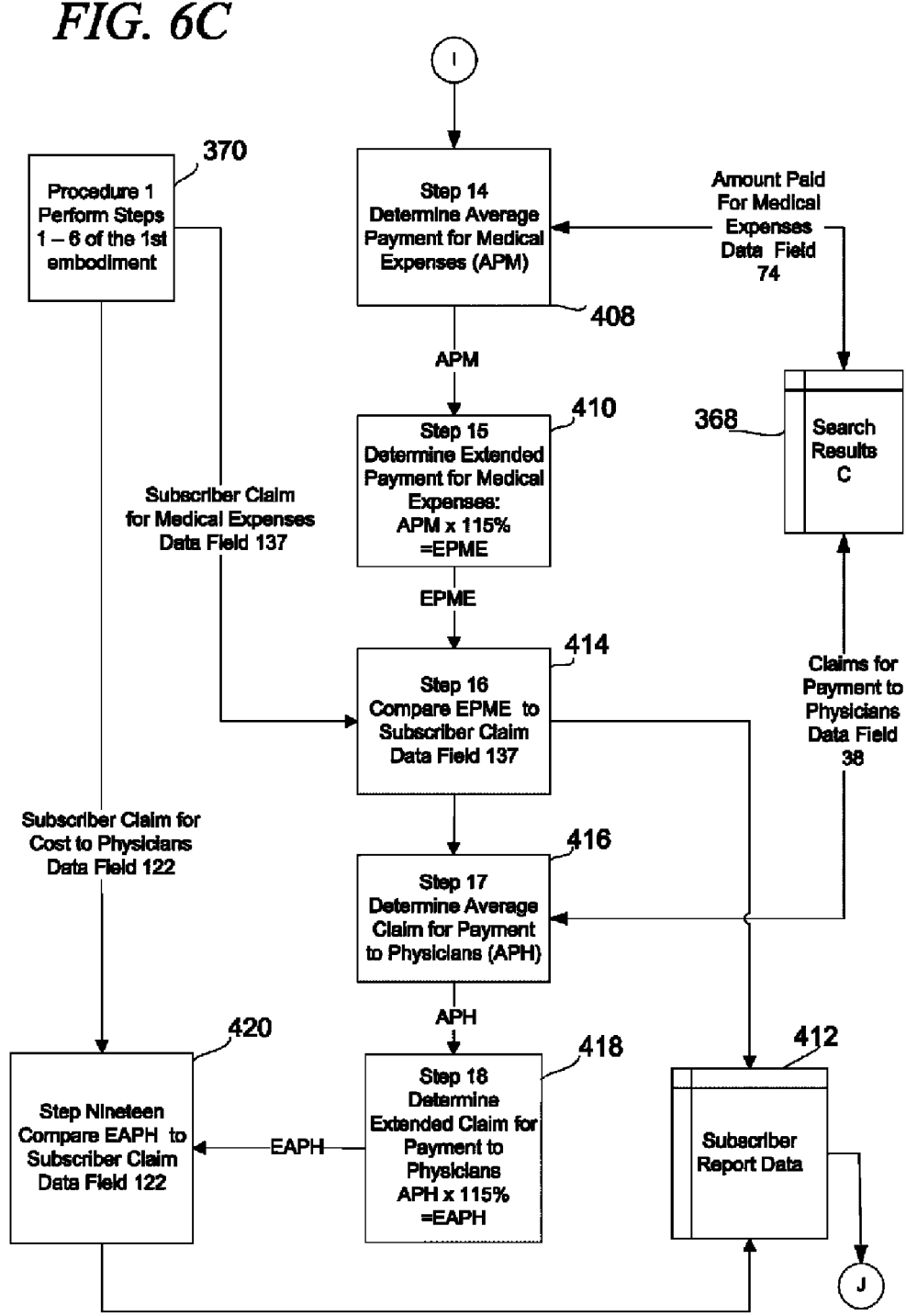
Figure 6D:
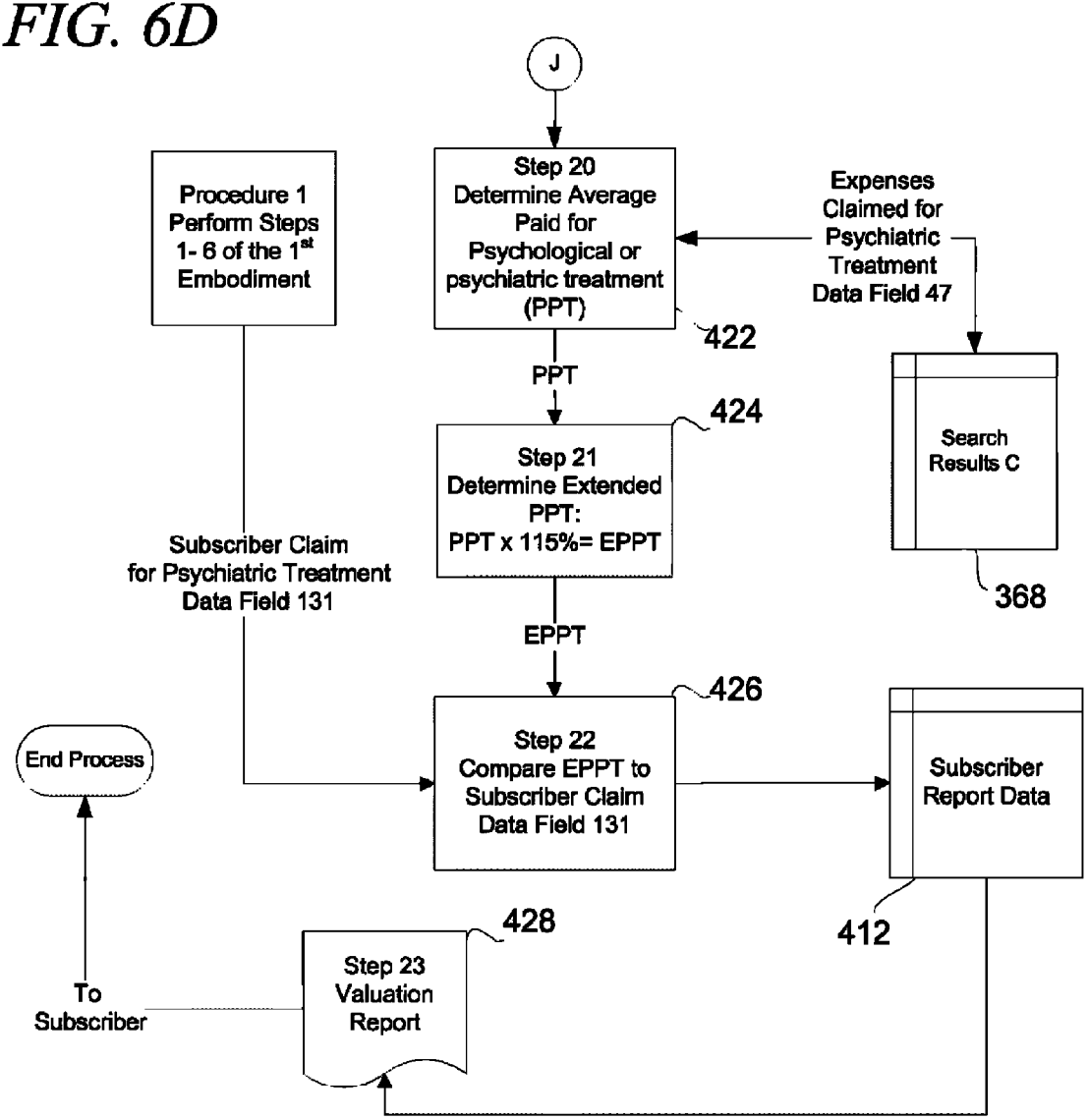

Type of Cases Searched
ZIP Code(s) Searched
Total Number of Cases with Matching HCPCS or ICD Codes
Total Number of Cases with Matching Narrative Diagnosis
Average Amount Claimed as Medical Damages
Average Amount Paid (less Property Damage and Lost Wages)
Average Settlement Multiple
Average High Settlement Multiple
Average Low Settlement Multiple
Subscriber's Claimed Medical Damages
Subscriber's Lost Wages
Subscriber's Property Damage
Average Settlement Value
High Settlement Value
Low Settlement Value
Average Total Settlement Value (with lost wages)
Average Total High Settlement Value (with lost wages)
Average Total Low Settlement Value (with lost wages)
Average Punitive Damages Award
Average Settlement Value with Punitive Damages
Average Settlement Multiple with Punitive Damages
Average Amount Awarded by Jury
Average Settlement Multiple in Jury Cases A fourth embodiment of the invention is illustrated in FIGS. 5a and 5b. The fourth embodiment allows an objective determination of the influence of jury verdicts on the average settlement value of the claim. In Step one 330 of the fourth embodiment, the system and method implementing the embodiment perform the steps described as Steps one, two, three, four, five and six of the first embodiment and creates search results "C" 340. The description of each step of the first embodiment is incorporated herein.

In Step two 332 the system identifies all cases in search results "C" 340 in which data field 82 indicates that the case was resolved by jury trial. The process creates search results "CJ" 346 for those cases. The process creates search results "CS" 348 for the cases that were settled or closed in any manner other than by jury.

The system then determines the average settlement multiple for cases in search results "CJ" 346. In Step three 334, the system determines the average damage award for the cases in search results "CJ" 334 by adding the amounts from data field 80 (total amount paid for claim less amount for property damage and punitive damages) to achieve a total amount and then dividing that amount by the number of cases included in search results "CJ" 346. The result is the average amount paid (the amount awarded by juries) to resolve cases in search results "CJ" 346.

Step four 336 determines the average amount claimed (AAC) as medical cost in the cases in search results "CJ" 346 by adding the amounts from data field 62 to achieve a total amount. The total is then divided by the number of cases included in search results "CJ" 346. The result is the average amount claimed as medical costs in the cases in search results "CJ" 346.

In Step five 338 the system determines the average settlement multiple for cases in search results "CJ" 346 using the formula: ADA÷AAC=JASM where "ADA" is the average damage award; "AAC" is the average amount claimed as medical costs; and, "JASM" is the average settlement multiple for cases in search results "CJ" 346.

Step six 342 determines the average potential value of the new claim if tried by jury using the formula: MC×JASM=JAV where "MC" is the amount claimed as medical cost by the subscriber; "JASM" is the total average settlement multiple determined in Step five; and, "JAV" is the potential average jury award value.

Next, the system determines the average value of the cases in search results "CS" 348—the cases that were settled or closed in any manner other than by jury. In Step seven 350 the system determines the average amount paid (AAP) to settle cases in search results "CS" 348 by adding the amounts from data field 80 (total amount paid for claim less amount for property damage and punitive damages) to achieve a total amount and then dividing that amount by the number of cases included in search results "CS" 348. The result is the average amount paid to resolve cases in search results "CS" 348.

In Step eight 352 the system determines the average amount claimed (AAC) as medical cost in the cases in search results "CS" 348 by adding the amounts from data field 62 to achieve a total amount. The total is then divided by the number of cases included in search results "CS" 348. The result is the average amount claimed as medical costs in the cases in search results "CS" 348.

In Step nine 354 the system determines the average settlement multiple for cases in search results "CS" 348 using the formula: AAP÷AAC=SASM where "AAP" is the average amount paid; "AAC" is the average amount claimed as medical costs; and, "SASM" is the average settlement multiple for cases in search results "CS" 348.

In Step ten 356 the system determines the average potential value of the case using the formula: MC×SASM=SASV where "MC" is the amount claimed as medical cost by the subscriber; "SASM" is the total average settlement multiple determined in Step eight (c); and, "SASV" is the total average settlement value.

Step eleven 358 generates a settlement report which shows pertinent information about the claim valuation decision. Specifically, the report will identify the potential award if the case is tried before a jury and the potential settlement value if the case is not tried by jury. Table 5 depicts a list of items that may be included in a claims valuation report. The list of items shown is not intended to be exhaustive, exclusive or unalterable.

FIGS. 6a, 6b, 6c and 6d depict the fifth embodiment of the invention. The system and method which implement this embodiment allows an objective determination (1) whether medical costs demanded in a new personal injury claim are exaggerated and possibly fraudulent and (2) whether the medical treatment protocol described in the new case is consistent with the standard treatment protocol for the same type of injuries in a particular geographic region.

The fifth embodiment is executed in three related procedures each of which incorporates steps from the first embodiment. The first procedure of the fifth embodiment determines whether the treatment protocol described by the subscriber is consistent with the treatment protocol for cases with the same injuries from the finalized case database. Step one 370 of the first procedure performs the processes described as Steps one, two, three, four, five, and six of the first embodiment. The description of each step of the first embodiment is incorporated herein. The system generates search results "C" 368.

In Step two 372, the system creates a list of all of the standardized medical diagnostic and billing code system entries contained in data field 23 (Treatment Protocol: Procedures, services or supplies using standardized medical diagnostic and billing code system entries) from each case in the injury subset of cases from search results "C" 368. In Step three 374 the system compares the data provided by the subscriber in data field 107 (Treatment Protocol: Procedures, services or supplies using standardized medical diagnostic and billing code system entries) to each entry from the data field 23 list. Step three (a) 376 initiates if none of the entries match. The system generates a report 392 of the potential for fraud through the report module 108. Step three (b) 378 initiates if any of the entries match. The system moves to Step four 382 and initiates the second procedure.

In the second procedure, the system determines whether the total amount claimed by the new personal injury case exceeds the average amount paid for the injury subset of cases from search results "C" 368. In Step four 382, the system determines the average amount paid (AAP) to resolve the cases in search results "C" 368 by adding the amounts from data field 80 (total amount paid for claim less amount for property damage and punitive damages) to achieve a total amount paid to resolve the cases in search results "C" 368. The total is then divided by the number of cases included in search results "C" 368. The result is the average amount paid to resolve cases in search results "C" 368.

Step five 384 multiples the AAP generated in Step four by a predetermined percentage variable greater than 100% of the AAP. The system and method implementing this embodiment of the invention uses 115% as the predetermined percentage variable. Nevertheless, it is assumed that the variable may be changed to another number. The use of a specific variable is illustrative only and should not be construed as limiting the scope of the embodiment but as merely providing illustrations of the operation of the system and method implementing the embodiment. The result is the determination of the high medical cost value (HM). Step six 386 compares the high medical cost value (HM) to the amount claimed as medical cost (MC) by the subscriber in data field 146. If the amount reported by the subscriber in data field 146 does not exceed the high medical cost value (HM), the system initiates Step six (a) 388, generates a report 392 for the subscriber and the process ends. If the amount reported in data field 146 exceeds the high medical cost value the system initiates Step six (b) 390 and warns the subscriber that further investigation of the claimed amounts is warranted by generating a report 392 through the report module 108. The system then initiates the third procedure (Step seven 394) in which a detailed analysis of specific items of damages claimed by the subscriber are compared to the average amounts paid or the average amount claimed for the corresponding items of damages in the database cases.

The first determination is whether the length of treatment claimed by the subscriber exceeds the average claimed by the database cases. In Step eight 396, the system determines the average length of treatment (ALT) by adding the amounts from data field 24 (length of treatment in weeks) to achieve a total number for all cases in search results "C" 368. The total is then divided by the number of cases included in search results "C" 368. The result is the average length of treatment for cases in search results "C" 368.

Step nine 398 multiplies the average length of treatment determined in Step eight by 115% resulting in the extended average length of treatment (EALT).

Step ten 400 compares the EALT generated in Step nine 398 to the amount claimed by the subscriber in data field 108. The results are held in storage 412 for inclusion in the subscriber report.

The next determination is whether the amount claimed by the subscriber for disability exceeds the average amount paid for disability in the database cases. In Step eleven 402 the system determines the average amount paid for disability (ADP) in the cases in search results C 368 by adding the amounts from data field 73 (amount paid as disability compensation) to achieve a total number for all cases in search results "C" 368. The total is then divided by the number of cases included in search results "C" 368. The result is the average amount paid as disability compensation for cases in search results "C" 368.

Step twelve 404 multiplies the average determined in Step eleven (ADP) by 115% resulting in the extended amount for disability payment (EADP).

Step thirteen 406 compares the EADP determined in Step twelve to the amount claimed by the subscriber in data field 120 (amount claimed for disability compensation). The results are held in storage 412 for inclusion in the subscriber report.

The next determination is whether the amount claimed by the subscriber for medical expenses exceeds the average paid in the database cases. In Step fourteen 408 the system determines the average amount paid for medical expenses (APM) by adding the amounts from data field 74 (amount paid for medical expenses) to achieve a total number for all cases in search results "C" 368. The total is then divided by the number of cases included in search results "C" 368. The result is the average amount paid for medical expenses for cases in search results "C" 368.

Step fifteen 410 multiplies the APM determined in Step fourteen 408 by 115% resulting in the extended payment for medical expenses (EPME). Step sixteen 414 compares the EPME to the amount claimed by the subscriber in data field 137 (total amount claimed for medical expenses). The results are held in storage 412 for inclusion in the subscriber report.

The next determination is whether the amount claimed by the subscriber for physicians, healthcare providers or healthcare institutions/facilities exceeds the average amount claimed for physicians, healthcare providers or healthcare institutions/facilities in the database cases.

In Step seventeen 416 the system determines the average amount paid for physicians, healthcare providers or healthcare institutions/facilities (APH) by adding the amounts from data field 38 (claim for payments to physicians, healthcare providers or healthcare institutions/facilities) to achieve a total number for all cases in search results "C" 368. The total is then divided by the number of cases included in search results "C" 368. The result is the average amount paid for physicians, healthcare providers or healthcare institutions/facilities for cases in search results "C" 368.

Step eighteen 418 multiplies the average determined in Step seventeen 416 (APH) by 115% resulting in the extended average paid for physicians, healthcare providers or healthcare institutions/facilities (EAPH).

Step nineteen 420 compares the EAPH to the amount claimed by the subscriber in data field 122 (cost for payments to physicians, healthcare providers or healthcare institutions/facilities). The results are held in storage 412 for inclusion in the subscriber report.

The system next determines whether the amount claimed by the subscriber for psychological or psychiatric treatment (PPT) exceeds the average amount claimed in the database cases. In Step twenty 422 the system determines the average amount claimed for psychological or psychiatric treatment by adding the amounts from data field 47 (expenses claimed for psychological or psychiatric treatment) to achieve a total number for all cases in search results "C" 368. The total is then divided by the number of cases included in search results "C" 368. The result is the average amount paid for medical expenses for cases in search results "C" 368.

Step twenty-one 424 multiplies the PPT by 115% resulting in the extended amount for psychological or psychiatric treatment (EPPT). Step twenty-two 426 compares the EPPT to the amount claimed by the subscriber in data field 131 (cost for psychological or psychiatric treatment). The results are held in storage 412 for inclusion in the subscriber report.

Step twenty-three 428 collects and complies the comparison data held in storage 412 and generates a comprehensive report through the report module which identifies each element of damages provided by the subscriber that equals or exceeds by 115% the average determined for the corresponding element of damages from the database cases. While not dispositive of the issue of fraud, a disparity of 115% or more gives the reasonably prudent negotiator reason to question the validity of the charges. The process ends upon distribution of the report to the subscriber.

The system described in the present invention determines an average settlement multiple which, when multiplied by the cost of medical expenses from the new claim, yields the current average monetary value of that claim. The determination of the settlement multiple is no longer based on the advocacy skills of the parties or the threat of court action. The method by which the value of the claim is determined is completely objective, consistent, reliable and fair to all parties. Objectively determining the settlement value shifts the emphasis from the 2% of cases that go to trial to the 98% of cases that are settled out of court. Instead of focusing on the potential outcome and cost of a trial, the participants focus on whether there is objective proof of conditions, factors or costs beyond the standards generated by the invention that can justify deviation from the invention's calculations. Fairness results because similarly situated individuals are treated similarly and objectively.

The invention collects data from multiple sources, including insurance company records and court case files, and generates reports from a huge database. Consistent with the law of larger numbers, these larger quantities of statistics provide more meaningful or credible results than any single source can achieve. Consequently, the results generated by the invention are more meaningful than the results achieved by the case by case approach of the current valuation process. The results achieved by the invention are also more meaningful than the results achieved by examination of data from a single insurance company or law firm. The potential size of the database allows the invention to generate specialized information products for law firms, insurance companies, state regulators and rating bureaus which have more statistical value than information available by other means. The potential size and data content of the invention permit the detection of fraud earlier and at lower cost than the current process. The database allows the invention to cross reference common features regarding participants, diagnoses, treatment protocols, and charges to demonstrate patterns or trends that suggest fraud.

The invention is the most effective educational tool ever created for the average personal injury claimant/consumer. The invention gives the claimant/consumer concrete data and information that he can use to decide whether to seek any compensation, whether to employ counsel, and whether the advice of counsel meets his immediate and long term needs. By requiring the claimant to gather detailed information about his claim, the invention teaches the lay claimant to understand more accurately what his demand for payment includes. That process leads some consumers to seek assistance of counsel and some to simply settle or abandon the claim. Either is a more informed decision than exists now.

Once widely adopted, the invention will become the standard on which all personal injury settlements are based and will substantially alter the day to day operation of the personal injury industry. The invention will reduce the roles of lawyers and insurance adjusters; standardize the mechanism by which consumers obtain and use data and information that affect the validity and value of a claim; and, reduce the influence of jury trials on the settlement process. Insurers are likely to generate tremendous savings and thereby increase profits by Predicting more accurately the risk and the cost of that risk from various kinds of personal injury claims in various regions of the country.

Reducing loss adjustment expenses

Reducing the number of claims that are litigated

Reducing the amounts actually paid to settle PI claims

Reducing the time required to settle the average claim, and

Reducing the number of support personnel required to dispose of current cases.

Eliminating the use of questionable or illegal conduct.

Because the invention collects and centralizes personal injury claims data from multiple sources it is uniquely positioned to serve the different interests of all participants in the personal injury process. From the perspective of all participants, the invention creates a standard and reliable claim valuation process that generates more objective, more uniform and fairer settlements than the previous process.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and or operational illustrations of methods, systems and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and or methodological acts, the claims are not limited to the features or acts described above. Rather, the specific features and acts described above are disclosed as example for embodiments of the invention.

What is claimed:

1. A system for determining value of a personal injury claim comprising:
   data storage in a computer system,
      wherein said data storage includes data representative of a pool of existing personal injury claims, and
      wherein the information collected from said existing personal injury claims includes data representative of:
         a cause of injury,
         a type of injury sustained,
         a location of where the personal injury occurred, and
         at least one amount paid a personal injury claimant for the personal injury sustained;
   an analysis module configured to:
      receive and process data representative of a new personal injury claim;
      identify a first subset of personal injury claims within said pool of existing personal injury claims, wherein said first subset of personal injury claims identified each include at least data representative of a cause of injury that is substantially similar to the cause of injury of the new personal injury claim received;
      process the subset of personal injury claims identified; and
      generate a case settlement value for the new personal injury claim.

2. The system of claim 1, wherein the value of the personal injury claim determined is measured in at least one of a monetary currency and a non-monetary currency, and wherein said pool of existing personal injury claims comprises information collected from finalized personal injury claims, wherein said information collected is stored in defined data fields within the data storage.

3. The system of claim 2 wherein the information collected from finalized personal injury claims includes:
   data representative of an amount paid a personal injury claimant for at least one personal injury sustained; and
   data representative of an amount paid the claimant for medical damages associated with the personal injury sustained; and
   data representative of amounts demanded by the claimant as damages.

4. The system of claim 1, including a data entry device configured to facilitate entry of data representative of a new personal injury claim.

5. The system of claim 1, wherein the analysis module is further configured to identify a second subset of personal injury claims within the first subset of personal injury claims, wherein each claim within the second subset of personal injury claims each includes data representative of a place of occurrence proximate a place of occurrence of the new personal injury claim received.

6. The system of claim 1, wherein the analysis module is further configured to identify a third subset of personal injury claims within the first subset of personal injury claims, wherein each claim within the third subset of personal injury claims is comprised of claims wherein the injuries sustained are substantially similar to the injuries sustained in the new personal injury claim received.

7. The system of claim 1, wherein the analysis module is further configured to process said first subset of personal injury claims to:
   determine an average amount paid as medical damages for said first subset of personal injury claims;
   determine an average amount claimed as medical damages for said first subset of personal injury claims;
   determine an average settlement multiple for said first subset of personal injury claims;
   determine an average monetary settlement value by multiplying the average settlement multiple by an amount determined to be the claimant's medical damages; and
   determine the case settlement value by adding an amount determined to be a claimant's lost wages to the average settlement value.

8. A method of determining a current average monetary settlement value of a new personal injury case comprising:
   accessing a database through an access module of a system, wherein the database contains information about finalized personal injury cases;
   identifying a subset of personal injury cases within the database through a query performed on said access module wherein said subset of personal injury cases include data representative of personal injury case characteristics similar to personal injury case characteristic data entered into the access module by a subscriber; and
   the access module processing the subset of personal injury cases and generating a case settlement value for the new personal injury case.

9. The method of claim 8 wherein the step of identifying a subset of personal injury cases within the database that include data representative of personal injury case characteristics similar to case characteristic data entered into the access module of the system by a subscriber includes at least:
   identifying a first subset of cases in the database that have the same causation as that described by a subscriber for the new personal injury case,
   identifying a second subset of cases within the first subset of cases that occurred in the same geographic area as that described by the subscriber for the new personal injury case,
   identifying a third subset of cases within the second subset of cases that occurred within a time window relevant to a time of occurrence of the new personal injury case; and
   identifying a fourth subset of cases within third subset of cases that resulted generally in the same types of injuries as the injuries described by the subscriber for the new personal injury case.

10. The method of claim 8 wherein the step of generating a case settlement value for the new personal injury case includes the steps of:
   determining an average amount paid as medical damages for all cases in the subset of personal injury cases identified;
   determining an average amount claimed as medical damages for all cases in the subset of personal injury cases identified;

determining an average settlement multiple for the subset of personal injury cases identified;

determining an amount for medical damages for the new personal injury claim based on the personal injury case characteristic data entered by the subscriber;

determining an average settlement value by multiplying the average settlement multiple by the amount determined to be the medical damages for the new personal injury claim; and determining a case settlement value for the new personal injury claim by adding an amount determined to be lost wages of at least one person injured in the new personal injury case.

11. The method of claim 9 further including a method for determining a settlement range for the new personal injury claim, the method comprising:

determining an average amount paid as medical damages for all cases in the fourth subset of cases, increasing the average amount paid as medical damages by a predetermined percentage variable that is greater than 100% of the average amount paid as medical damages identifying cases in the fourth subset of cases in which the amount paid as medical damages exceed the value of the average amount paid as medical damages when increased by the predetermined percentage variable in the fourth subset of cases;

determining an average amount paid as medical damages in the set of cases in which the amount paid as medical damages exceed the value of the average amount paid as medical damages when increased by the predetermined percentage variable for all cases in the fourth subset of cases;

determining an average amount claimed as medical damages in the set of cases in which the amount paid as medical damages exceed the value of the average amount paid as medical damages when increased by the predetermined percentage variable for all cases in the fourth subset of cases;

determining an average high settlement multiple for the set of cases in which the amount paid as medical damages exceed the value of the average amount paid as medical damages when increased by the predetermined percentage variable for all cases in the fourth subset of cases;

determining an average high settlement value for the set of cases in which the amount paid as medical damages exceed the value of the average amount paid as medical damages when increased by the predetermined percentage variable for all cases in the fourth subset of cases by multiplying the average high settlement multiple by an amount provided by the subscriber as medical damages for the new personal injury claim;

determining an average low settlement value by performing the following steps:

decreasing the average amount paid as medical damages by a predetermined percentage variable that is less than 100% of the average amount paid as medical damages identifying cases in the fourth subset of cases in which the amount paid as medical damages is less than the average paid as medical damages when decreased by the predetermined percentage variable all cases in the fourth subset of cases determining an average amount paid as medical damages in the set of cases in which the amount paid as medical damages is less than the average paid as medical damages when decreased by the predetermined percentage variable for all cases in the fourth subset of cases;

determining an average amount claimed as medical damages in the set of cases in which the amount paid as medical damages is less than the average paid as medical damages when decreased by the predetermined percentage variable for all cases in the fourth subset of cases;

determining an average low settlement multiple for the set of cases in which the amount paid as medical damages is less than the average paid as medical damages when decreased by the predetermined percentage variable for all cases in the fourth subset of cases; and determining an average low settlement value for the set of cases in which the amount paid as medical damages is less than the average paid as medical damages when decreased by the predetermined percentage variable for all cases in the fourth subset of cases by multiplying the average low settlement multiple by an amount provided by the subscriber as medical damages for the new personal injury claim.

12. The method of claim 8 wherein the access module further determines the effect of punitive damages on a potential average settlement value of a personal injury claim comprising:

the access module accessing a database including data representative of finalized personal injury cases;

the access module identifying a first subset of personal injury cases in the database having claims having similar personal injury causation as that described by a subscriber entering a new personal injury case into the settlement value system;

the access module identifying a second subset of cases within the first subset of personal injury cases wherein the injury occurring in each case occurred in the same geographic area as the new personal injury case entered into the settlement value system by the subscriber;

the access module identifying a punitive damages subset of cases within the second subset of cases in which punitive damages were awarded;

the access module determining an average amount awarded as punitive damages in the punitive damages subset of cases;

the access module determining an average amount paid as medical damages for all cases in the punitive damages subset of cases;

the access module determining an average amount claimed as medical damages for all cases in the punitive damages subset of cases;

the settlement value system determining an average settlement multiple for the punitive damages subset of cases;

the access module determining a medical damages amount for the new claim based on information input by the subscriber;

the access module determining an average settlement value by multiplying the average settlement multiple by the amount determined to be the medical damages amount for the new claim;

the access module determining an average amount paid as medical damages for all cases in the second subset of cases;

the access module determining an average amount claimed as medical damages for all cases in the second subset of cases;

the access module determining an average settlement multiple for the second subset of cases;

the access module determining the medical damages associated with the new claim based on information provided by the subscriber; and the access module determining an average settlement value by multiplying the average settlement multiple by the amount determined to be the medical damages associated with the new claim.

13. The method of claim 12, wherein the access module generates a report comparing the average amount awarded as punitive damages and the average settlement value.

14. The method of claim 12, wherein the punitive damages subset of cases further includes:
identifying a further subset of cases within the second subset of cases that occurred within a relevant time of occurrence of the injury that occurred in the new personal injury case; and
identifying cases in the further subset of cases that resulted in the same types of injuries as the injuries described by the subscriber for the new personal injury case.

15. A method by a settlement value system of objectively determining influence of jury verdicts on an average settlement value of a personal injury claim comprising:
accessing a database by a personal injury valuation module, wherein the database contains information about finalized personal injury cases;
identifying a subset of personal injury cases in the database that includes data representative of personal injury case characteristics similar to personal injury case characteristic data entered into the personal injury valuation module by a subscribe, wherein the personal injury cases identified were resolved by jury verdict; and
the personal injury module processing the subset of personal injury cases and generating a case settlement value for the new personal injury case.

16. The method of claim 15 wherein the step of generating a case settlement value for the new personal injury case includes the steps of:
determining an average amount awarded for all cases in the subset of personal injury cases identified;
determining an average amount paid as medical damages for all cases in the subset of personal injury cases identified;
determining an average amount claimed as medical damages for all cases in the subset of personal injury cases identified;
determining an average settlement multiple for the subset of personal injury cases identified;
determining an amount for medical damages for the new personal injury claim based on the personal injury case characteristic data entered by the subscriber;
identifying a subset of cases for the subset of cases identified that were not tried by a jury;
determining an average amount awarded for all cases in the subset of personal injury cases identified that were not tried by a jury;
determining an average amount paid as medical damages for all cases in the subset of personal injury cases identified that were not tried by a jury;
determining an average amount claimed as medical damages for all cases in the subset of personal injury cases identified;
determining an average settlement multiple for the subset of personal injury cases identified that were not tried by a jury;
determining an amount for medical damages for the new personal injury claim based on the personal injury case characteristic data entered by the subscriber;
determining an average settlement value by multiplying the average settlement multiple by the amount determined to be the medical damages for the new personal injury claim; and
determining a case settlement value for the new personal injury claim by adding an amount determined to be lost wages of at least one person injured in the new personal injury case.

17. The method of claim 15 wherein the wherein the settlement value system generates a report which demonstrates the difference between the potential value of a claim if tried by jury and the potential value of the claim if settled without a jury trial.

18. A method implemented by an access module of a computer system to determine whether a new personal injury claim is potentially fraudulent, the method comprising:
the computer system connected to a database;
the access module facilitating accessing the database containing information about finalized personal injury cases;
the access module identifying a subset of personal injury cases in the database that includes data representative of personal injury case characteristics similar to personal injury case characteristic data entered into the personal injury valuation module by a subscriber; and
the access module comparing data representative of at least one of treatment protocols, medical procedures, services and supplies reported for the subset of personal injury cases identified with data input into the settlement value system by the subscriber;
comparing costs for the medical procedures reported for the identified subset of personal injury cases with medical cost for procedures input into the settlement value system by the subscriber;
generating a report of analysis illustrating the subscriber's claimed medical procedures
that deviate from the medical procedures in the database, wherein the report of analysis further illustrates where the subscriber's claimed costs for medical procedures deviate from medical procedures in the database cases by a fixed percentage.

19. The method of claim 18, wherein standardized medical billing codes are used to compare costs for the medical procedures reported for the identified subset of personal injury cases with medical cost for procedures input into the settlement value system by the subscriber.

20. The method of claim 18, wherein the step of identifying a subset of personal injury cases comprises the steps of:
identifying personal injury cases within the database that have an injury causation similar to an injury causation described by a user entering data regarding a new personal injury case into the access module;
identifying cases in a causation subset of cases that occurred in the same geographic area as a geographic area described by the subscriber for the new personal injury claim;
identifying cases in the geographic area subset that occurred within a relevant time of occurrence of the new claim
identifying cases in the relevant time subset of cases that resulted in the same types of injuries as described by the subscriber for the new personal injury case.

* * * * *